(12) United States Patent
De Graaff

(10) Patent No.: US 10,757,016 B2
(45) Date of Patent: Aug. 25, 2020

(54) DISTRIBUTING AND AGGREGATING RESOURCE DATA IN A NETWORK

(71) Applicant: FAIRFLOW TECHNOLOGIES HOLDING B.V., JD Delft (NL)

(72) Inventor: John De Graaff, JD Delft (NL)

(73) Assignee: FAIRFLOW TECHNOLOGIES HOLDING B.V., JD Delft (NL)

( * ) Notice: Subject to any disclaimer, the term of this patent is extended or adjusted under 35 U.S.C. 154(b) by 0 days.

(21) Appl. No.: 16/096,533

(22) PCT Filed: Apr. 25, 2017

(86) PCT No.: PCT/EP2017/059802
§ 371 (c)(1),
(2) Date: Oct. 25, 2018

(87) PCT Pub. No.: WO2017/186720
PCT Pub. Date: Nov. 2, 2017

(65) Prior Publication Data
US 2019/0116117 A1 Apr. 18, 2019

(30) Foreign Application Priority Data
Apr. 28, 2016 (EP) ..................... 16167485

(51) Int. Cl.
*H04L 12/753* (2013.01)
*H04L 12/911* (2013.01)

(52) U.S. Cl.
CPC .............. *H04L 45/48* (2013.01); *H04L 47/78* (2013.01); *H04L 47/783* (2013.01); *H04L 47/822* (2013.01); *H04L 47/829* (2013.01)

(58) Field of Classification Search
CPC ..... H04L 12/18; H04L 12/1881; H04L 12/56; H04L 45/302; H04L 45/64; H04L 47/24; H04L 47/78; H04L 47/783; H04L 67/1053; H04N 21/6405; H04N 21/6408
See application file for complete search history.

(56) References Cited

U.S. PATENT DOCUMENTS

2017/0104681 A1* 4/2017 Azgin ................. H04L 45/7453

OTHER PUBLICATIONS

Xue et al., "Maximizing for Data Aggregation in Wireless Sensor Networks", Oct. 24, 2005 (Year: 2005).*

* cited by examiner

*Primary Examiner* — Jae Y Lee
*Assistant Examiner* — Aixa A Guadalupe Cruz
(74) *Attorney, Agent, or Firm* — Davidson, Davidson & Kappel, LLC

(57) ABSTRACT

A method of distributing and aggregating resource data, such as transmission capacity. First, for each edge node in the domain a respective spanning tree is constructed that connects said edge node to all other edge nodes and that identifies for each node other than said edge node in said tree a single upstream neighbour node and zero or more downstream neighbour nodes. Second, any node that has a change in resource data in connection with a particular spanning tree it is a member of, such as the transmission capacity increase or decreases, will send a message to update each of its upstream and downstream neighbour in that spanning tree on said change. Third, each such neighbour will calculate impact of said change to its own resource data and will send a message to update each of its upstream and downstream neighbour in that spanning tree on said impact.

9 Claims, 25 Drawing Sheets

Figure 1:
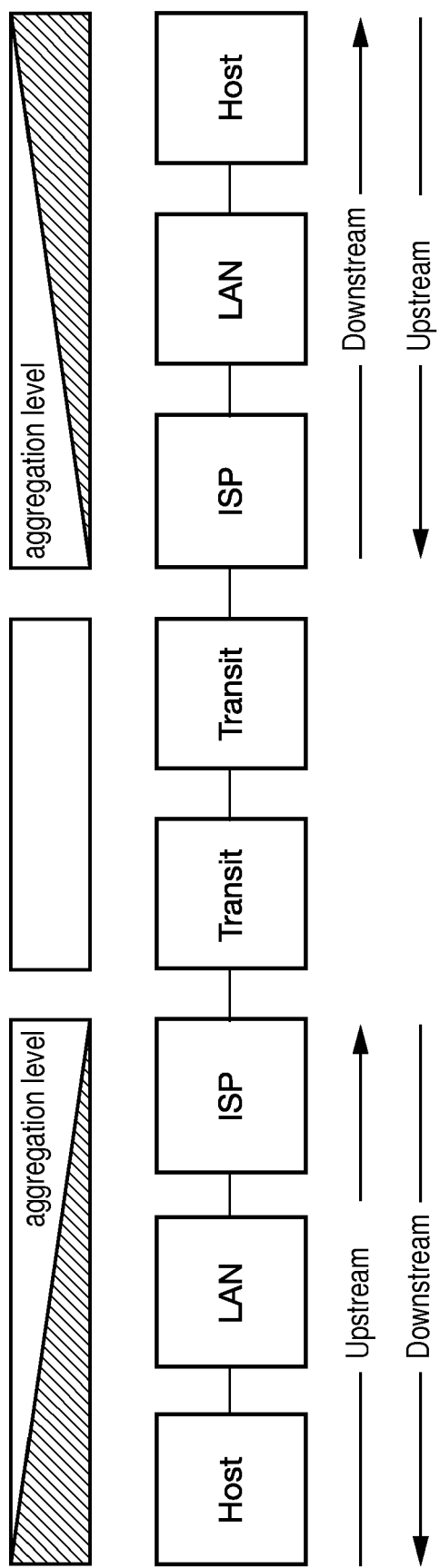

| Time (steps) | Event | Reaction | (Send/Recv) Link : DISVN | SourceID (in msg) | RootCNT (in msg) | EdgeCNT (in msg) | RootCNT (learned) | EdgeCNT (learned) | Upstream : RootCNT (learned) | Downstream : EdgeCNT (learned) |
|---|---|---|---|---|---|---|---|---|---|---|
| 1 | send DDISC | wait for UDISC replies | (S) 10.1.0.1 : 1<br>(S) 10.2.0.1 : 1 | 10.0.0.1 | 1 | (n.a.) | 1 (defined @Root) | 0 | (n.a.) | - |
| 2.1 | receive UDISC | (no Downstream Node as EdgeCNT=0) | (R) 10.1.0.1 : 1 | 10.0.0.3 | (n.a.) | 0 | 1 (defined @Root) | 0 | (n.a.) | - |
| 2.2 | receive UDISC | (no Downstream Node as EdgeCNT=0) | (R) 10.1.0.1 : 1 | 10.0.0.4 | (n.a.) | 0 | 1 (defined @Root) | 0 | (n.a.) | - |
| 3 | | | | | | | | | | |
| 4 | receive UDISC | - | (R) 10.2.0.1 : 1 | 10.0.0.4 | (n.a.) | 0 | 1 (defined @Root) | 0 | (n.a.) | - |
| 5 | receive UDISC (gratuitous) | (add Downstream Node as EdgeCNT>0) | (R) 10.1.0.1 : 1 | 10.0.0.3 | (n.a.) | 2 | 1 (defined @Root) | 3 | (n.a.) | 10.0.0.3 : 3<br>10.0.0.4 : 0 |
| 6 .. 9 | (wait next DISIT) | | | | | | | | | |
| 10 | send DDISC | wait for UDISC replies | (S) 10.1.0.1 : 2<br>(S) 10.2.0.1 : 2 | 10.0.0.1 | 1 | (n.a.) | 1 (defined @Root) | 3 | (n.a.) | 10.0.0.3 : 3<br>10.0.0.4 : 0 |

N1: Data of Node1 (NodeID: 10.0.0.1), Root of SAT-1 (SATID: 8.1.7.255) (RootID: 10.0.0.1)

*Fig. 20*

N3: Data of Node3 (NodeID: 10.0.0.3) in SAT-1 (SATID: 8.1.7.255) (RootID: 10.0.0.1)

| Time (steps) | Event | Reaction | (Send/Recv) Link : DISVN | SourceID (in msg) | RootCNT (in msg) | EdgeCNT (in msg) | RootCNT (learned) | EdgeCNT (learned) | Upstream : RootCNT (learned) | Downstream : EdgeCNT (learned) |
|---|---|---|---|---|---|---|---|---|---|---|
| 1 | receive DDISC | reply UDISC if UNC, also fwd DDISC | (R) 10.1.0.2 : 1 | 10.0.0.1 | 1 | (n.a.) | 2 | 0 | 10.0.0.1 : 2 | - |
| 2 | send UDISC | (UNC=success) | (S) 10.1.0.2 : 1 | 10.0.0.3 | (n.a.) | 0 | 2 | 0 | 10.0.0.1 : 2 | - |
| 3 | send DDISC | - | (S) 10.3.0.2 : 1<br>(S) 10.5.0.1 : 1<br>(S) 10.6.0.1 : 1<br>(S) 10.7.0.1 : 1 | 10.0.0.3 | 2 | (n.a.) | 2 | 0 | 10.0.0.1 : 2 | - |
| 4.1 | receive UDISC | (no Downstream Node as EdgeCNT=0) | (R) 10.3.0.2 : 1 | 10.0.0.2 | (n.a.) | 0 | 2 | 0 | 10.0.0.1 : 2 | - |
| 4.2 | receive UDISC | (add Downstream Node as EdgeCNT>0) | (R) 10.6.0.2 : 1 | 10.0.0.5 | (n.a.) | 1 | 2 | 2 | 10.0.0.1 : 2 | 10.0.0.5 : 2 |
| 4.3 | receive UDISC | (add Downstream Node as EdgeCNT>0) | (R) 10.7.0.2 : 1 | 10.0.0.6 | (n.a.) | 1 | 2 | 2 | 10.0.0.1 : 2 | 10.0.0.5 : 2<br>10.0.0.6 : 2 |
| 5 | send gratuitous UDISC | - | (S) 10.1.0.2 : 1 | 10.0.0.3 | (n.a.) | 2 | 2 | 2 | 10.0.0.1 : 2 | 10.0.0.5 : 2<br>10.0.0.6 : 2 |

*Fig. 20 (continued)*

| N6: Data of Node6 (NodeID: 10.0.0.6) in SAT-1 (SATID: 8.1.7.255) (RootID: 10.0.0.1) | | | | | | | | | | |
|---|---|---|---|---|---|---|---|---|---|---|
| Time (steps) | Event | Reaction | (Send/Recv) Link : DISVN | SourceID (in msg) | RootCNT (in msg) | EdgeCNT (in msg) | RootCNT (learned) | EdgeCNT (learned) | Upstream : RootCNT (learned) | Downstream : EdgeCNT (learned) |
| 3 | receive DDISC | reply UDISC if UNC, also fwd DDISC | (R) 10.7.0.2 : 1 | 10.0.0.3 | 2 | (n.a.) | - | - | - | (n.a.) |
| 4.1 | send UDISC | (UNC=success) | (S) 10.7.0.2 : 1 | 10.0.0.6 | (n.a.) | 1 | 3 | 1 (defined @Edge) | 10.0.0.3 : 3 | (n.a.) |
| 4.2 | receive DDISC | ignore (UNC=fail) | (R) 10.8.0.2 : 1 | 10.0.0.4 | 2 | (n.a.) | 3 | 1 (defined @Edge) | 10.0.0.3 : 3 | (n.a.) |
| 5 | send DDISC: no | (DISVN received before on this link) | | | | | 3 | 1 (defined @Edge) | 10.0.0.3 : 3 | (n.a.) |

*Fig. 20 (continued)*

| Node | S1UN | S1DN | S2UN | S2DN | S3UN | S3DN | S4UN | S4DN | S5UN | S5DN | S6UN | S6DN | S7UN | S7DN |
|------|------|------|------|------|------|------|------|------|------|------|------|------|------|------|
| N1 | (RN) | N3 N4 | - | - | - | - | - | - | - | - | - | - | - | - |
| N2 | - | - | (RN) | - | (RN) | N3 N4 | (RN) | N3 N4 | - | - | - | - | - | - |
| N3 | N1 | N5 N6 | N1 | N5 N6 | N2 | N5 N6 | N2 | N5 N6 | N5 | N6 N4 | N6 | N5 | N4 | N5 |
| N4 | N1 | N7 | N1 | N6 N7 | N2 | N7 | N2 | N7 | N3 | N7 | N6 | N7 | N7 | N3 N6 |
| N5 | N3 | (EN) | N3 | (EN) | N3 | (EN) | N3 | (EN) | (RN) | N3 | N3 | (EN) | N3 | (EN) |
| N6 | N3 | (EN) | N3 | (EN) | N3 | (EN) | N3 | (EN) | N3 | (EN) | (RN) | N3 N4 | N4 | (EN) |
| N7 | N4 | (EN) | N4 | (EN) | N4 | (EN) | N4 | (EN) | N7 | (EN) | N4 | (EN) | (RN) | N4 |

*Fig. 22*

DISTRIBUTING AND AGGREGATING RESOURCE DATA IN A NETWORK

This application is a U.S. national phase application under 35 U.S.C. of § 371 of International Application No. PCT/EP2017/059802, filed Apr. 25, 2017, which claims priority of European Patent Application No. 16167485.8, filed Apr. 28, 2016 the disclosures of which are hereby incorporated by reference herein.

FIELD OF THE INVENTION

The invention relates to a method of distributing and aggregating resource data, such as transmission capacity in a network domain comprising of plural nodes. The invention further relates to nodes for use in such a method and to a computer program product.

INTRODUCTION TO THE INVENTION

In networks such as the internet, the term Quality of Service or QoS refers to the concept of monitoring and guaranteeing transmission rates, error rates, and other network characteristics. QoS is particularly important when dealing with delay-sensitive transmissions such as live video broadcasts, telephony or remote control of devices.

Many networks, in particular the networks that make up the internet, were not built with QoS in mind. They operate on a simple best-effort model. Some providers do provide traffic class priorities (so on aggregate flows), but only for specific applications like Voice-over-IP and real-time streaming video/audio and only for traffic streams that terminate (at server in datacenters) in this providers network. Other than quality control for these 'Over-The-Top' (OTT) services, there is no quality control for generic internet traffic.

On some private transport networks (company wide-area networks), there is some QoS control or even guarantees, but this quality control is only on aggregates of traffic flows. For example: all Voice-over-IP traffic is assigned a specific traffic class and this aggregate flow receives a certain priority over other traffic classes. Note that quality control on individual application traffic flows (also called 'micro flows') is still not feasible in private networks.

The lack of quality control and guarantees on a per-flow basis, is most prominent (causing the most problems, most traffic congestion) in 'Access Networks'. The cause of (a high change of) traffic congestions is the simple fact that most traffic aggregation happens in this part of the Internet. Note that the other network types are: Transit Networks (also called carriers, interconnecting other networks) and Datacenter Networks.

Examples of 'Internet Access Networks' are Home (consumer) internet access (ISP) (typically over copper cables), Company (location) internet access (ISP) (typically over fiber cables), Mobile internet access (like 3G, 4G), WiFi hotspot Internet Access, Home Local Networks (LAN) and Company Local Networks (LAN).

Figure 2:
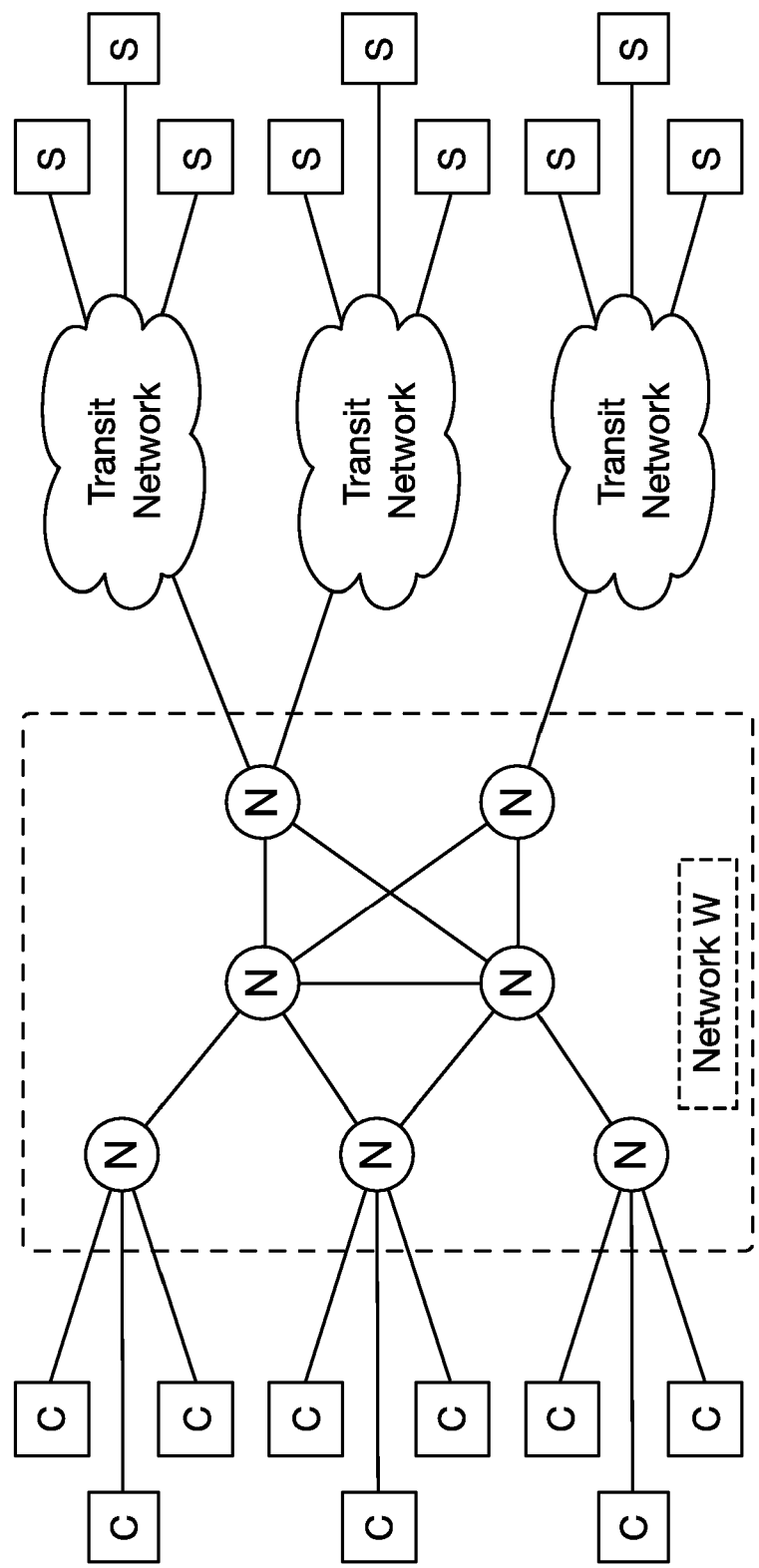

In order to describe the problem, solution and prior art deficiencies, it is required to first describe the fundamentals of packet networking and its properties. FIG. 2 schematically illustrates a first concept. Network. W is a packet transport network (as commonly used in Internet networks), which is mathematically modeled as a 'flow network', where the network is a directed graph consisting of nodes (math: vertices) which are interconnected with links (math: edges), where every link has a specific packet transport capacity in either direction and the traffic is a function of packet emissions over time and the nodes forward packets between an ingress and egress links with a certain impact function, where packets are either forwarded with a certain delay or dropped.

The network W consist of a connected sets of Nodes and Links, denoted as W (N, L). Here N is a set of Nodes (math: vertices) which are packet forwarding switches or routers. A node $n \in N$. L is a set of Links (in formal mathematical terms: edges) which are packet transmission links which are either 'half-duplex' with a specific shared capacity for both directions combined or 'full-duplex' with a specific capacity for either direction. Capacity is defined as a discrete natural number with the unit bits per second (bps).

A link between nodes a and b is denoted as $l(a, b) \in L$ where $a, b \in N$.

Full-duplex capacity in direction $a \rightarrow b$: $c(l, a, b) \in \mathbb{N}$ Half-duplex capacity: $c(l) \in \mathbb{N}$ Nodes and other elements in the network W can be Servers S, Clients C and generic nodes N. C is a set of Clients, which initiate traffic streams to Servers or (peer) Clients. S is a set of Servers, which accept traffic streams from Clients. Further, a network may connect to Transit Networks, where T is a set of Transit Networks, which are connected to nodes N of network W through links L and are connected to servers S.

Client c, server s, Transit network t: $c \in C$, $s \in S$, $t \in T$.

It is assumed that 11 clients and servers have been assigned a unique network address, which the network uses to route and deliver traffic. Each address is a member of the total network address space (in the current Internet this is the IPv4 or IPv6 address space). A transit network has been assigned a set of prefixes. A prefix is a contiguous set (range) of addresses defined by a base address (the network address) and a network mask (a natural number) that denotes the size of the range. These prefix sets of different transit networks might overlap in the sense that the base address is the same, although it is required that the network mask is different for same-base prefixes.

Address of client c or server s: $a(c), a(s) \in A$ where A is the full IPv4 or IPv6 address space. Of course other address spaces may be used as desired.

Figure 3:
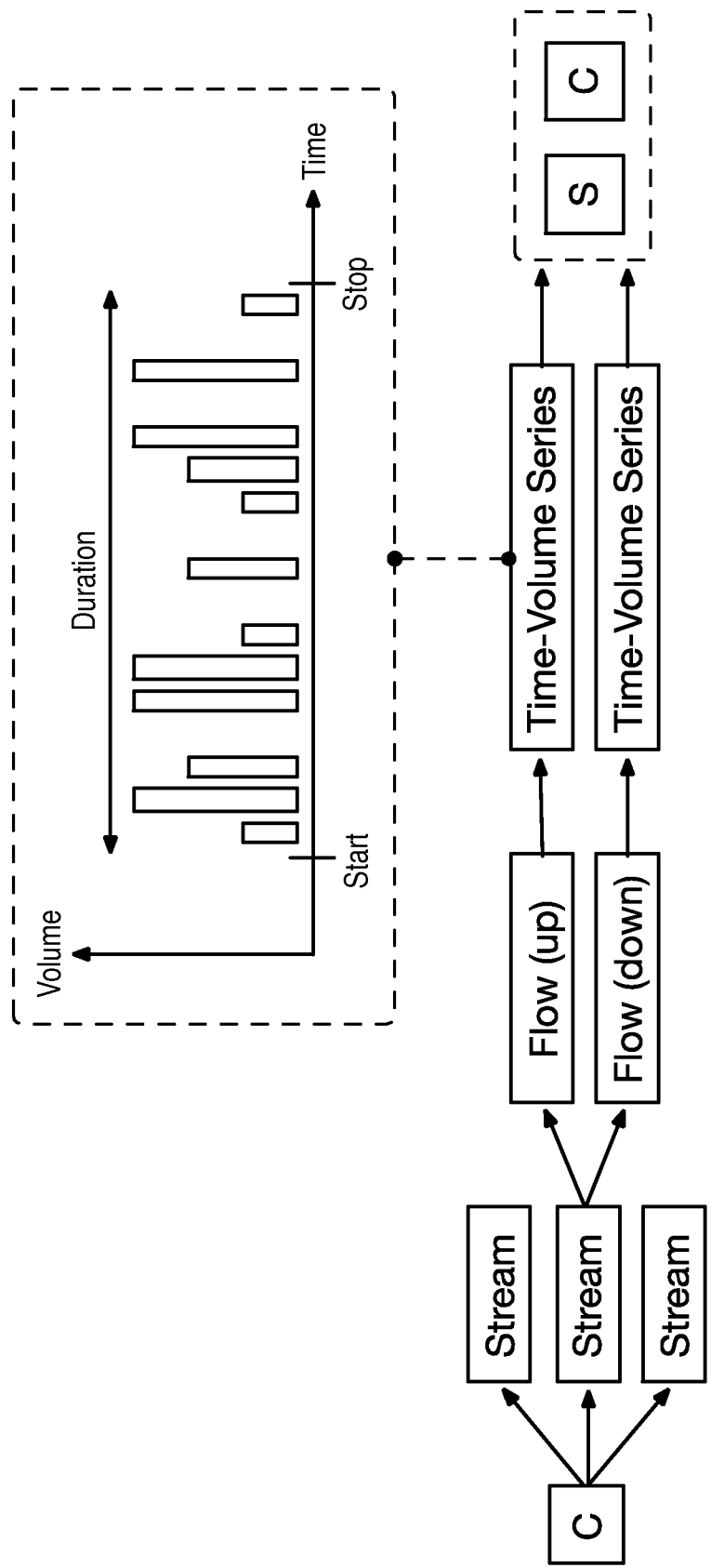

Address prefix set of transit network t: $a(t) \in P$ where P is the prefix space (b, m), base address $b \in A$, mask $m \in \mathbb{N}$ FIG. 3 schematically illustrates the concept of traffic streams. A traffic stream is a combination (aggregate) of traffic flows between an initiator, client c, and a responder p, which is either a server s or peer-client p. A stream consists of one or more unidirectional traffic flows created and consumed at the endpoints (nodes). F is a set of Flows, which is a discrete function of packet emissions over time, specifying the size of the packet during an specific interval of time.

Stream s between $c \rightarrow p$: $s(c, p)$ where client $c \in C$ and peer/server $p \in S \hat{\ } C$ Flow function giving packet size f(t) over time t: $f(t) \in \mathbb{N}$, $f(t) > 0$, time $t \in \mathbb{R}$, t in interval (t1, t2).

Note that a Traffic Stream is an combination (aggregate) of flows, which is either the sum of flows between two specific clients or peers (a client stream), or the sum of flows of different unrelated clients over one link in one direction (a link stream).

Figure 4:
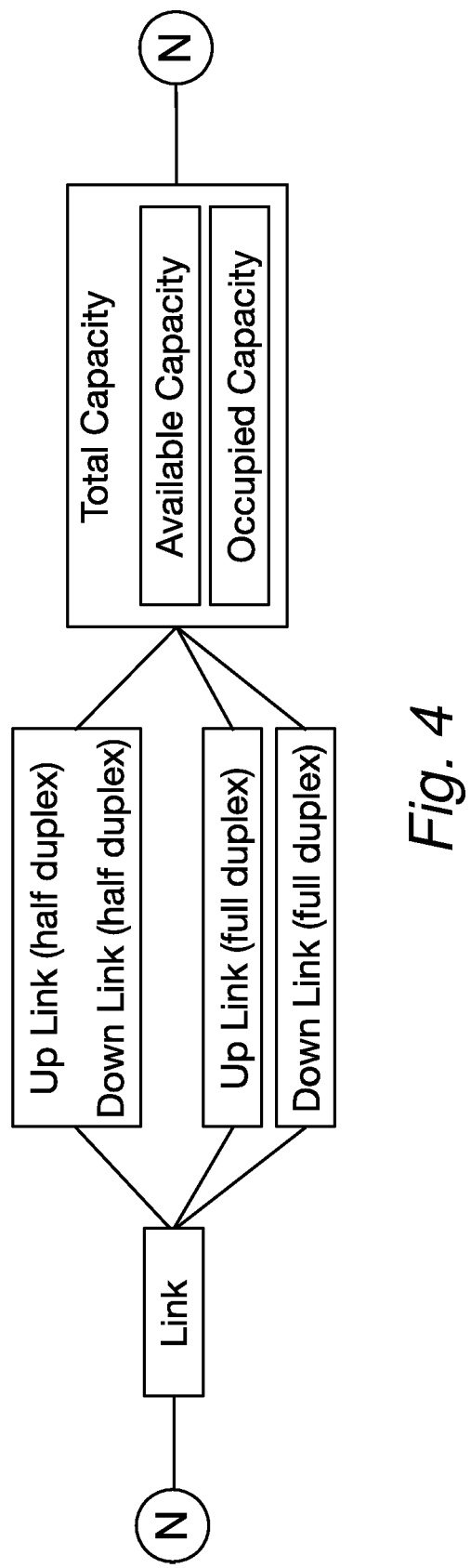

FIG. 4 schematically illustrates the concept of links. A link l(a, b) between nodes a and b has a certain traffic transporting capacity and transport latency. This link is either half-duplex where traffic in both directions share the same capacity or the link if full-duplex where each direction has an independent capacity, which may be the same value (symmetric link) or a different capacity (asymmetric link).

The Occupied Capacity is a function over time and is the (linear) sum of all flows over this link in the same direction. The Available Capacity is a function over time and is the (linear) difference between the total capacity (which is constant over time) and the occupied capacity over time Total capacity: $c=c(1)\in \mathbb{N}$ Occupied capacity over time: $o(t)=\Sigma f(t)\in \mathbb{N}$, for all flows $f(t)$, time $t\in \mathbb{R}$ Available capacity: $a(t)=c-o(t)\in \mathbb{N}$, time $t\in \mathbb{R}$ Note that the total and occupied capacity is defined in terms of 'net' capacity where any transmission overhead or inefficiencies are regarded as a static component and subtracted from, the capacity. For example for a 1 Gbps Ethernet full-duplex link may be assigned a total capacity of 950 Mbps where the missing 50 Mbps is the estimated sum of 'capacity loss' to account for interframe gaps and start-of-frame intervals. Another example is a half-duplex link (usually a wireless medium) where radio channel capacity is shared and which is assigned an estimated net capacity of 60% relative to the modulation capacity).

Figure 5:
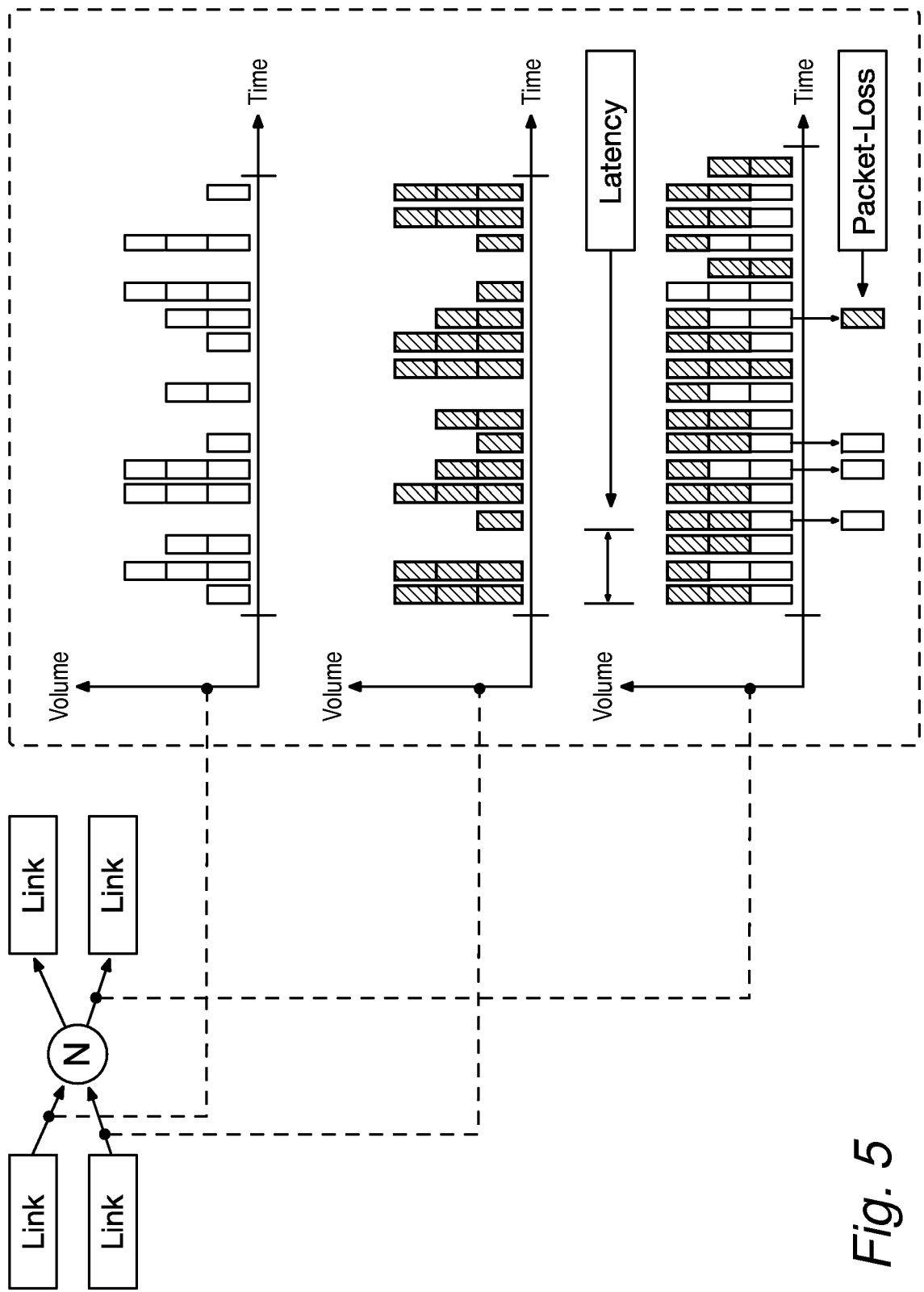

FIG. 5 schematically illustrates the concept of traffic handling at nodes. A Node receives one or more traffic flows on its (ingress) links, then makes a forwarding decision on a per-packet level, and then sends the traffic flows on its (egress) links. The Node is said to perform a traffic forwarding function, where the traffic units (packets) receive some forwarding impact, which is either a packet being forwarded with a certain level of delay (latency) or a packet being dropped. The per-packet latency is the result (sum) of a fixed component, depending on the processing speed of the node, and a variable component, depending on the egress link being available at a certain moment in time and if not the node can delay (buffer) the packet up to a certain maximum, where the maximum is defined by a depth (length) of the buffers (queues) and the amount of traffic (packets) in the buffer. When the queues are full, any further traffic packets are dropped (deleted from node internal memory). This packet loss can be modeled with infinite latency.

Forwarding function at node n: $w(Ln)=Le$, where traffic streams from all ingress Links (L1, L2, . . . Ln)$\in L$ are combined into egress Links $Le\in L$.

Impact function m on flow $f(t)$ at node n giving the latency: $m(n, f, t)\in \mathbb{R}$ where $n\in N$, $f(t)$ is the flow function over time $t\in \mathbb{R}$ The Traffic Load (TL) of a Traffic Flow is the 'Virtual Bandwidth' which is Volume per Second using the metric bits per second (bps). TL is calculated by taking the average bandwidth, using a normalized 50 ms window, and subtract some bandwidth proportional to the 'allowed' packet-loss and add some bandwidth proportional to the 'required' latency (where the extra bandwidth 'margin' should provide a insurance for proper latency).

Traffic Load is accounted on. OSI Network Layer or Layer-3 level (L3), which typically is the IP (IPv4 or IPv6) protocol. Traffic Load for a Traffic Flow is the total volume or summarized size of all IP packets flowing per second. This includes the IP overhead (header) and higher-layer overhead (typically TCP/UDP headers). This does not include the Layer-2 (typically Ethernet or MPLS) or lower layers overhead (headers and trailers).

The Capacity Traffic Load (CTL) of a Link is also expressed in L3 volume. The CTL is the maximum TL that this Link could carry by using the IMIX average packet-size of 340 bytes on that Link. For example, the CTL of a full-duplex Gigabit Ethernet link (L2-CAP=1 Gbps) is L3-CTL=899 Mbps.

The following formula extracts L2 overhead:

L3-CTL=L2-CTL*AVG-L3-PS/(AVG-L3-PS+L2-POH)

899 Mbps=1000 Mbps*340/(340+38)

AVG-L3-PS=Average Layer-3(IP) Packet-Size

L2-POH=Packet Overhead

L2-POH in this case is 38 bytes (14:Header+4:Trailer+12:Gap+8:Preamble).

The Reserved Resources are called Occupied Traffic Load (OTL).

We see these models at the moment: SAUD, MAUD, MABD (Single/Multiple Access Uni-/Bidirectional).

Latency is the time it takes for data (the start of a packet or e of data) to be transported across a network. Latency has multiple sources/components, which may be dependent on packet-size (proportional) or be independent of it (static). In order to define the same metric (microsecond), we define the proportional latency not in microseconds/bit(size) but in microseconds, where we define a normalized packet-size of 512 bytes (4096 bits).

For practical purposes a quantization of 1 microsecond is regarded as appropriate accuracy. The combination of a Node and its direct Upstream Link is called a 'Hop'. The Hop Latency (HL) is measured "real-time" in the SAT-ND algorithm disclosed below using the DISC messages. The measured results are averaged and saved in the Local-Database. The Hop Latency is then used to calculate Path Hop Latency, which is all Hops combined from an Edge-Node to a Transit-Node.

We use these names for size-dependency:

Proportional Hop Latency size-dependent latency

Static Hop Latency=size-independent latency

Latency is defined as the sum of Node Forwarding Latency and Link Transport Latency. Node Forwarding Latency is the sum of Node Processing Latency (static) and Node Queuing Latency (proportional). Link Transport Latency is the sum of Link Transmission Latency (proportional) and Link Propagation Latency (static). The Hop latency is sufficiently described by 2 metrics: Static Hop Latency (SHL) and Proportional. Hop Latency (PHL).

Quality is a hard concept to accurately capture in math. First we differentiate the quality of traffic transport, typically called QoS, and the quality of user experience, typically called QoE. These metrics are correlated but strongly dependent on the application (that sends and receives the transported data) being able to mitigate flow impact. This invention defines quality $q(t)$ (QoS) of a particular flow as the 'aggregate flow impact', which is the sum of flow impact functions of each node over the path the flow takes. The flow impact function was defined before as giving the latency (or packetloss as an infinite latency) over time.

Quality $q(t)$ over time of a certain flow $f(t)$ on a certain path: $q(t)=\Sigma m(n, f, t)\in \mathbb{R}$, for all flow impact functions $m(n, f, t)$ of each node n on the path the flow takes over time $t\in \mathbb{R}$ The most important metric for any distributed (network) algorithm is cost. This invention defines cost (math: complexity) is a measure of either computational cost (math: time complexity) or memory cost (math: space complexity) or both.

Cost of an (distributed) algorithm: o=(t, r), where runtime t∈$\mathbb{R}$, space r∈$\mathbb{N}$ In order for a network to provide QoS control on a per-flow basis, we require these fundamental processes:

1. Connection Admission Control (CAC), which determines if the network has enough capacity to transport a traffic flow within its required quality parameters.

2. Traffic Accounting (TA), which keeps a state (memory) of all (allowed) traffic flows and the capacity they occupy at each link and node of the network. CAC is dependent on. TA.

The main problem with current QoS methods is algorithm cost, which either makes the algorithm impractical (algorithm can not finish in time), or makes the network equipment expensive (cost of processors and memory). This is why ATM is not used anymore in the Internet and why IntServ was never implemented on large scale. More generally, this is why there is no QoS control mechanism (on a per-flow basis), and therefore, there are no quality (QoS) guarantees in the Internet.

Various approaches have been suggested in the prior art. For example, Rena Bakhshi proposes in the master's thesis "Formal Analysis of Tree-Based Aggregation Protocols" (http://www.few.vu.nl/~rbakhshi/papers/Thesis.pdf) a tree-based aggregation protocol that computes an aggregation function in a decentralized way using an aggregation tree. Dam and Stadler (http://www.csc.kth.se/~mfd/Papers/RVK05.pdf) propose a protocol that computes aggregates of device variables for network management purposes. Other background references are Deepali Virmani, Gargi Mandal, Nidhi Beniwal, Saloni Talwar, "Dynamic Data Aggregation Tree for Data Gathering in Wireless Sensor Network" (http://www.ijitee.org/attachments/File/v2i3/C0440022313.pdf) and the Intelligent Water Drops (IWD) algorithm (https://en.wikipedia.org/wiki/Intelligent_Water_Drops_algorithm).

Much work has been done on aggregating network state. Prieto & Stadler (A-GAP: An adaptive protocol for continuous network monitoring with accuracy objectives, A G Prieto, R Stadler, Network and Service Management, IEEE Transactions on 4 (1), 2-12) aggregate network state (e.g. link utilization) based on a tree constructed from the network topology. It is basically summing up hierarchically. They are event-driven so not periodic (although they do mention periodic updates, e.g. page 5 equation 14).

U.S. Pat. No. 6,167,445 discloses a computer network having multiple, dissimilar network devices includes a system for implementing high-level, network policies. A policy server translates the high-level policies inherent in the selected traffic template and location-specific policies into a set of rules. They do not seem to aggregate bandwidth availability. This 'policy system' does not solve the problem of quality control for micro-flows. No way to make Traffic Accounting (TA) scalable. No way to make Connection Admission Control (CAC) scalable.

U.S. Pat. No. 5,485,455 discloses a SFPS (Secure Fast Packet Switching) method which provides a packet switched data communications network with quality of service in bandwidth-constrained situations. They work with aggregated information (see e.g. section 9.2 on local valuespace and section 9.3 the process from steps 201 to 218). SFPS is 'direct' implementation of ATM, with the 'cells' replaced by 'packets'. Their vision is that upgrade to ATM is expensive and upgrading an existing packet-network to SFPS is cheaper or easier. Just like ATM, SFPS also requires setup of Virtual Circuits (VCs) before traffic can be transported. And worse: setup a VC for every micro-flow. Therefor it has the same scalability issues as ATM.

Ramanathan and Steenstrup in their paper "Hierarchically organized multihop mobile wireless networks for quality of service support" (S. Ramanathan and M. Steenstrup, Hierarchically-organized, multihop mobile wireless networks for quality-of-service support, Mobile Networks and Applications, Vol. 3, No. 1, 1998) propose a system that uses per-flow QoS-routing, where the routing-process is used in a hierarchical way and also aggregates QoS (link-level) information in a hierarchical way (by aggregating link level information into a cluster-level information). MMWN uses Virtual. Circuits (VCs) like ATM is doing. Also the routing is done on VC level (not on a per-packet level). This requires a path/circuit setup to complete before traffic is actually sent. The big problem with this is the algorithm cost, because this expensive process is required for every individual traffic flow (micro-flow). All above citations are hereby incorporated into this disclosure by reference.

Thus, there is a clear need in the art for a low-cost and efficient algorithm to maintain networks.

SUMMARY OF THE INVENTION

The invention provides an improved method of distributing and aggregating resource data, such as transmission capacity, as claimed in claim 1. An advantage of the invention is that it enables informing all leaf nodes efficiently on resource data changes within the network domain by only informing of changes in trees they are member of. As the number of concurrent data flows in a network is usually extremely high, it is impractical or impossible to keep track of relevant changes if all changes in all data flows are received by a leaf node.

The invention solves the algorithm cost problem, in two complementary ways: reducing the memory cost by aggregation of traffic accounting. Note that 'aggregation of traffic accounting' is different from 'traffic aggregation'. The latter is what happens to traffic flows as they are combined and forwarded in a network node (although the accounting aggregation could follow the same topology). We call this solution: State Aggregation
reducing the time cost by decoupling the moment of traffic registration of individual traffic flows from the moment of (aggregated) accounting in the network. The traffic registration finishes in (near) real-time, where the traffic accounting happens on a periodic basis (like every 1 second). We call this solution: Periodic Accounting State aggregation is done using dynamic setup of tree accounting structures, called Source-Aggregation Trees (SAT). Periodic Accounting is done using a interval-based Upstream Traffic Accounting (UTA) mechanism. Note that both the SA and the PA solution require the SAT-RM algorithm to work. SA and PA cannot operate at acceptable (algorithmic) cost without this SAT-RM. Strictly speaking, the SAT-ND algorithm is not required for the SAT-RM to function.

The SAT-RM algorithm does require a proper SAT topology and related DAS routing information, but that could be configured by another means or by hand, although that would be (very) impractical for large and dynamic networks, which is common in the current Internet.

In addition to the prior art cited above, some further prior approaches that attempt to manage quality (QoS) for each individual traffic flow in a network are now discussed for contrast. The approaches are ATM (ANSI/ITU-T standard) and IntServ/RSVP (RFC2215 standard).

IntServ is in many ways an implementation of ATM (a OSI layer-2 technology) in an IP network (a OSI layer-3 technology). The most prominent difference is that ATM is based on circuit-switching where traffic is sent in cells (similar to packets) along a predetermined path or circuit, where IntServ/IP is based on packet-switching where each individual packet is routed independently and no prior circuit setup is required.

ATM uses the PNNI routing algorithm that can route (decide which paths to take) circuits (in which traffic flows) based on quality requirements of an application. ATM uses a Connection Admission Control (CAC) mechanism to determine if a path is available within the given quality requirements and deny if not. In order for CAC to reliably operate the routing mechanism of PNNI is required for each individual traffic flow. In order for PNNI to be able to route flows (circuit-based), the network has to keep a database, either central or distributed, which keeps the accounting of total capacity per link, occupied capacity (previous registrations) per link or path and available capacity per link or path.

IntServ uses the RSVP (Reservation Protocol) to attempt to reserve resources (quality requirements on a per node basis) along the path of each individual traffic flow. The path is decided by an independent (routing) process (which may or may not use some quality requirements). The RSVP implements both a Connection Admission Control (CAC) mechanism and a resource reservation mechanism. It does not specify how individual nodes do traffic accounting. Accounting is obviously required in order to reliably determine if a traffic flow is allowed or not.

However, there are differences between the ATM and IntServ/RSVP systems and our SAT/UTA inventions. First, both ATM and RSVP handle CAC based on a full network search, meaning that every node in the network path is questioned for availability. The SAT/UTA system handles CAC based on the current availability is known by the network edge node. Second, both ATM and RSVP handle TA on a per-node (per-link) basis. The SAT/UTA system handles TA based on per-SAT (tree) basis where traffic is accounted hierarchically (signaling traversing upstream and downstream the tree).

In an embodiment step 3 is skipped for an upstream or downstream neighbour which is the node of step 2. An advantage of this embodiment is that loops of calculations are avoided.

In a further embodiment the messages of steps 2 and/or 3 are accumulated into combined messages carrying all resource data that belongs to all SAT tree structures. An advantage of this embodiment is to make message transmission more efficient.

In a further embodiment the combined message are sent at predetermined intervals such as once per second.

In a further embodiment, instead of sending a message for each update, updates are accumulated over spanning trees and sending the accumulated updates to all upstream and downstream nodes of said node.

In a further embodiment the resource data is aggregated using a data type-specific aggregation function.

In a further embodiment a first resource data type is "Link Local" and a second resource data type is "Edge Path", where Link. Local represents resource data of a link to the upstream node in said tree and Edge Path represents resource data of all links of nodes along a path in the tree connecting said node to the root node of the tree.

The invention further provides for a computer system configured to operate as an edge node of the invention, a computer system configured to operate as a node of the invention, and a computer-readable storage medium comprising executable code for causing a computer to perform the method of the invention.

DETAILED DESCRIPTION OF CERTAIN EMBODIMENTS

General Concepts

Figure 6:
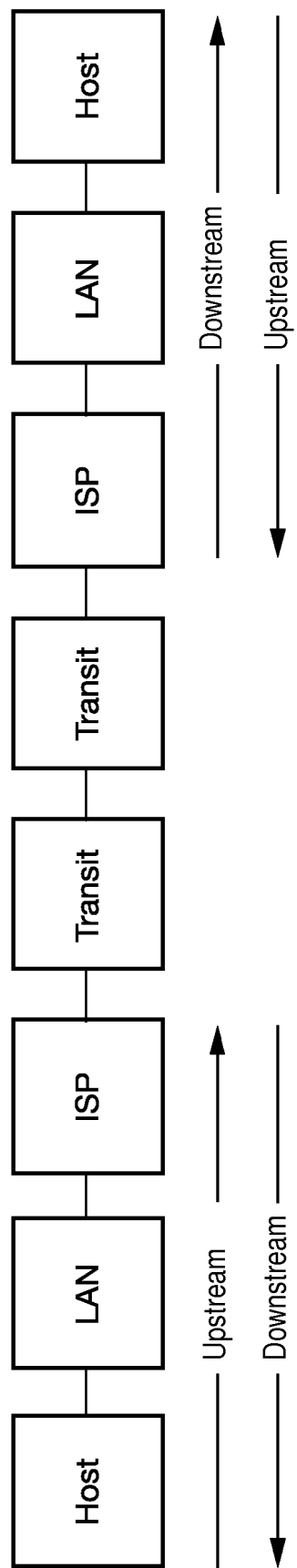

FIG. 6 schematically illustrates the concept of a network domain. Note that there is only one transit domain shown here, while in practice there are multiple transit providers or carriers that interconnect ISP provider networks. A domain is defined as set of nodes and internal links under a common control. A domain is connected to devices or other domains using external links. Examples of Domains are: Enterprise Local Area Networks (LAN), Horne LANs, Internet Service Provider (ISP) Networks, Mobile Internet Networks, Transit Networks and Public WiFi Hotspot Networks.

Figure 7:
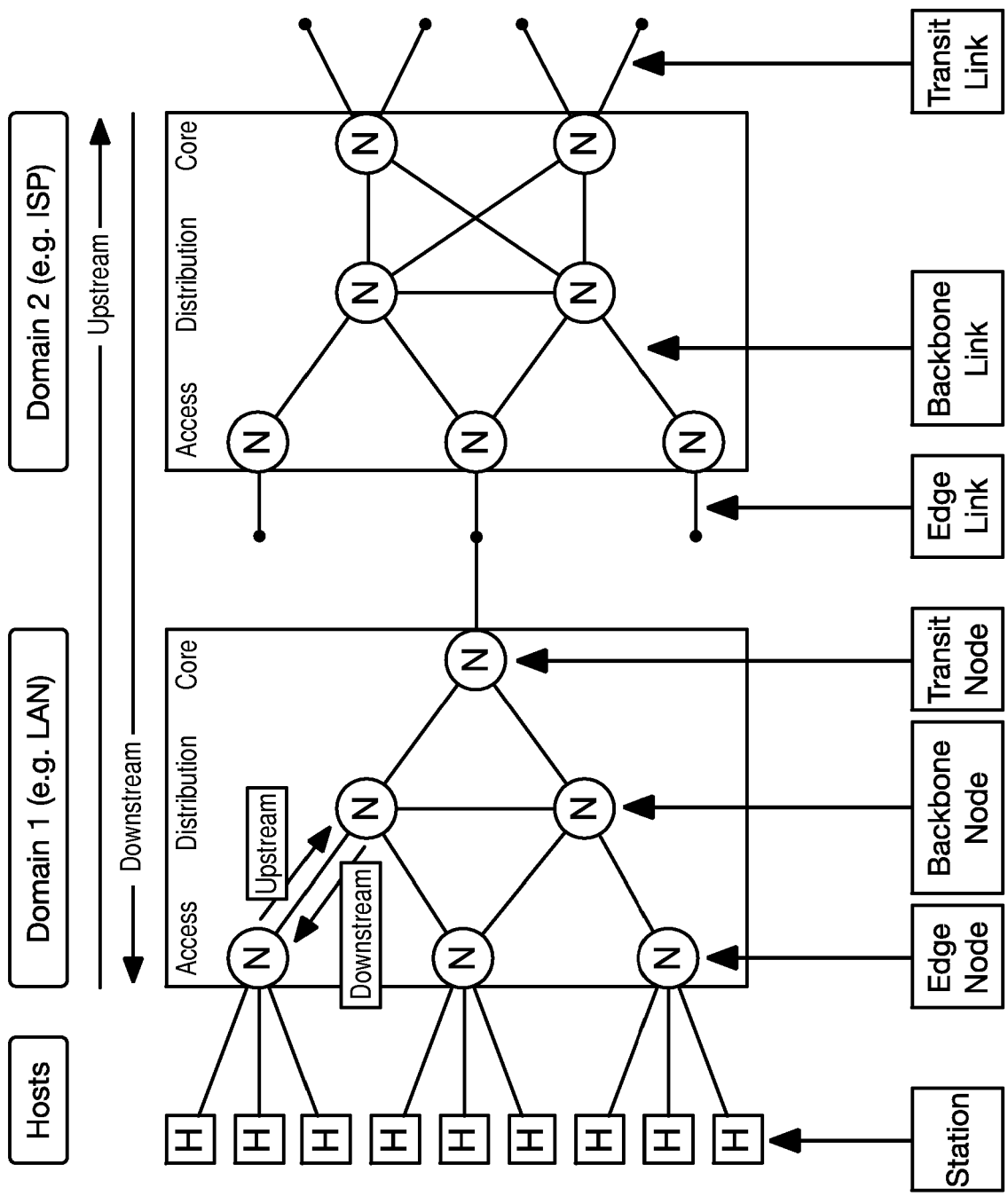

FIG. 7 schematically illustrates traffic flow. The direction of traffic flow from a device endpoint towards the core of a network is called 'Upstream'. The direction of traffic flow from the core of a network is called 'Downstream'. Note that this direction is different from Upload and Download which is defined a by Client-Server endpoint relation. Note that the Traffic-Flow Direction on a Link can be different on a per-SAT basis.

A Traffic Session that is initiated by a Client (Application) typically has two unidirectional related traffic flows. First, forward traffic flow, i.e. from Client to Server (Peer), and second, reverse traffic flow, from Server (Peer) back to Client. The traffic registrations and reservations are typically done for both directions. When we talk about a traffic direction in this disclosure, we mean the forward traffic flow (and the reverse flow is assumed to be handled in the same way but separately and in the reverse direction).

Figure 8:
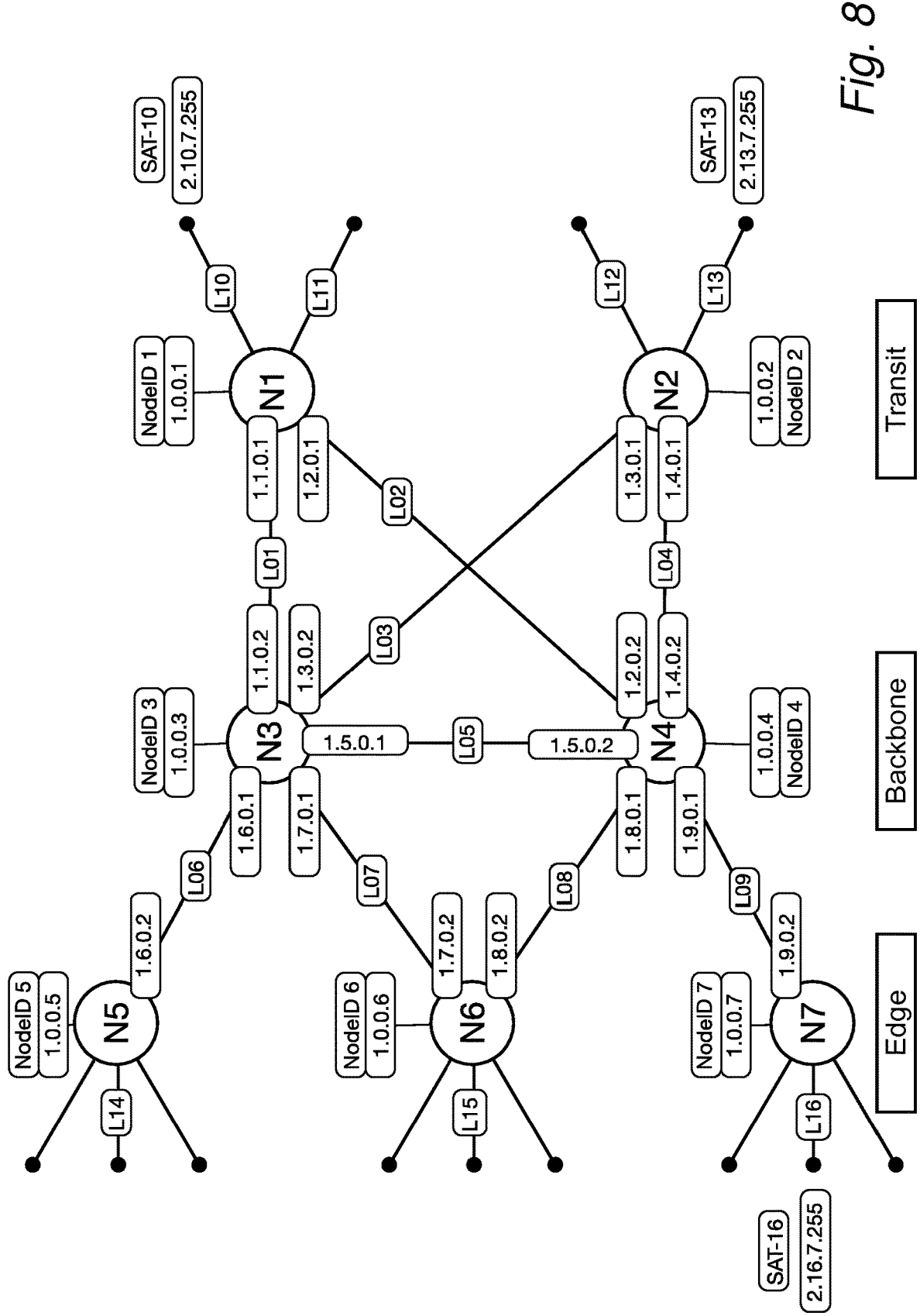

FIG. 8 schematically illustrates an example transport network and IP (v4) addresses on all interfaces, including a loopback interface on each Node, which would be the NodeID. For the construction of the SAT tree, the concept of Upstream Node is important.

Some Additional Terminology

NodeID Unique and reachable IP address that identifies a Node
SATID Unique IP address that identifies a SAT tree
USN Upstream SAT Node
USNID Upstream SAT Node ID
DSN Downstream SAT Node
DSNID Downstream SAT Node ID
UNC Upstream Node Check
NHA Next-Hop Address, as determined in the Routing Table For Node1, the Node2 is 'Upstream' if the Next-Hop Address of NodeID2 is the same as the Next-Hop Address of the SATID, or the Upstream Node Check (UNC) is: NHA(USNID2)=NHA(SATID).

In IP-based transport networks (either IPv4 or IPv6), each interface on a Node is assigned an unique IP address. Typically, a Node has an additional 'internal' interface, called loopback interface, of which the IP address is used to manage and/or identify this Node. In FIG. 8, the Routing Table in Node3(ID:10.0.0.3) is such that NHA(SATID)= 10.1.0.1 and NHA(Node1.ID=10.0.0.1)=10.1.0.1, from which it follows that Node1(ID:10.0.0.1) is the 'Upstream Node' (or Parent) of Node3(ID:10.0.0.3).

Figure 9:
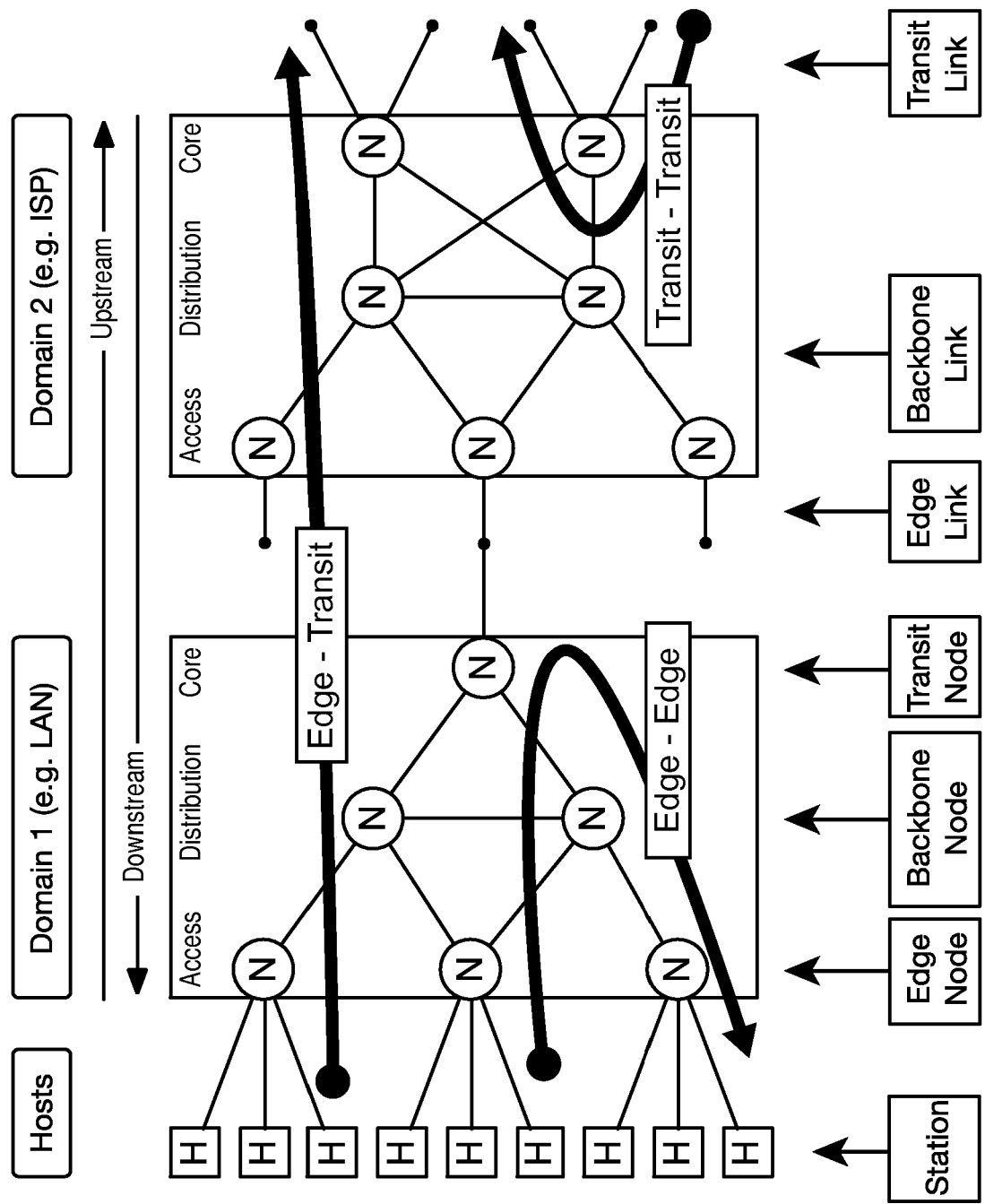

FIG. 9 schematically illustrates the concept of Link Types:

Edge Link: The downstream link connecting a domain to a device endpoint or downstream domain.

Transit Link: The upstream link connecting a domain to a upstream domain.

Backbone Link: An Domain-internal link is called a 'Backbone Link'.

A Node has one or more 'Roles' depending on the type of its direct Links:

a Node has an Edge Role when minimum one Link is an Edge Link.

a Node has a Transit Role when minimum one Link is a Transit Link a Node has a Backbone Role when minimum one Link is a Backbone Link We use the name Edge Node when it has the Edge Role. Same for Backbone and Transit Node. Note that an. Edge Node may also have a Backbone Role, for example when this Node is a Backbone-Type connection to another Edge Node.

Also note that an Edge Node may also have a Transit Role, for example when this Node has a direct Transit-Type connection. If this Node does not have a Backbone Role (so only the Edge and Transit Roles) then the SAT-ND and SAT-RM Algorithms are not required.

The invention presumes traffic to flow Edge-to-Edge, and Edge-to-Transit, as per FIG. 9. For Transit-to-Transit traffic resource accounting and reservations at the "Transit Edge" are more complicated in a scalable way. Thus, the invention is primarily targeted for "Access Networks" or "Tier-3 provider Networks".

An external Link (all Edge and Transit Links) has a Destination Addresses Set (DAS), which is a set of Network Addresses ("IP prefixes") that are reachable via this Node and onto a particular external Link to an External. Node or client endpoint or Domain. All traffic with a destination address that is within this DAS set, is called DAS traffic or SAT Traffic (as a SAT is defined to be the routing-topology of a DAT set).

The DAS set is defined by a Routing System. This Routing System has its own processes to define (optimal) traffic routes inside a Domain, which is called Intra-Domain or Interior. Gateway Protocol, or IGP, like OSPF, RIP, IS-IS and EIGRP, Note that Inter-Domain or Exterior Gateway Protocols, or EGP like BGP, are not relevant to the DAS set (because external EGP routes will be mapped to internal. IGP routes).

The invention considers this Routing System an external system or process—the invention has no Routing System/Process of its own. Note that this paper only describes IPv4 addresses in the SAT algorithms for convenience. The same mechanisms can be used for IPv6.

Also, the same mechanism can be used in case some or all Nodes are Layer-2 or Layer-2.5 (such as MPLS) "switches", provided that the traffic still uses IP (IPv4 or IPv6) as Layer-3 Network Protocol and each Layer-2 Node has a unique and reachable IP address to send and receive the SAT protocol messages, like a management or loopback IP address in the switch.

Source Aggregation Tree

Figure 10:
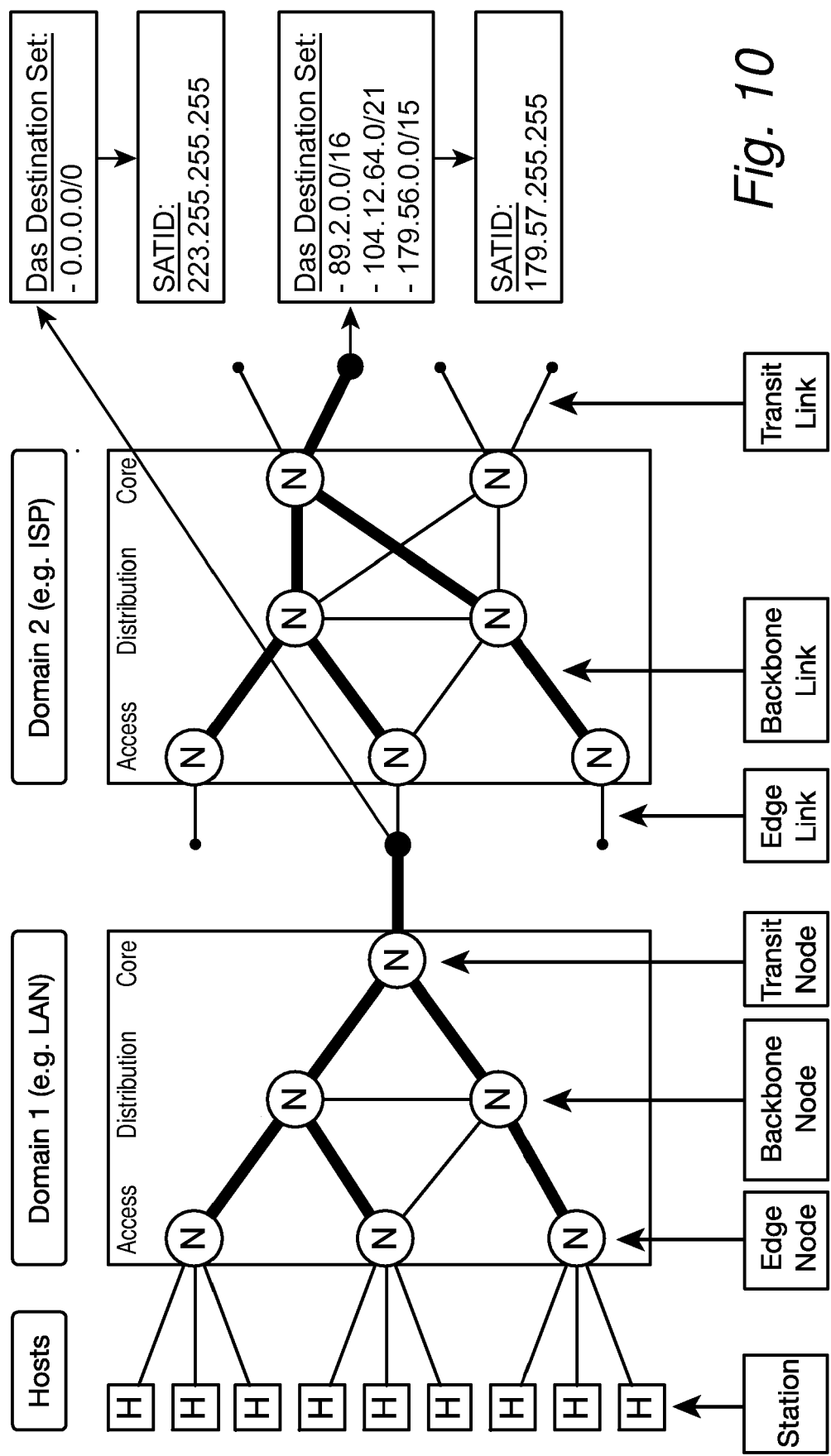

FIG. 10 schematically illustrates one possible SAT Tree and DAS set in two example Domains. We define a Source Aggregation Tree (SAT) structure in a Network Domain as an "overlay tree structure" of Nodes and Internal Links for the purpose of traffic accounting, a SAT connects all Edge Nodes in that Domain, a SAT has a particular Transit or Edge Node which is the root of the tree and called SAT Root Node (SRN) for that SAT, a SAT tree has no loops (it is acyclic), a SAT tree includes only Internal Links for which an internal Node forwards all DAS traffic onto that Internal Link, and for which the DAS set is the destination of a particular Transit Link in case of Transit Root Node or the destination of a all Edge Links combined in case of an Edge Root Node and for which this External Root Link is active (link up) and the described DAS set is non-empty.

Notes:

in mathematics a tree structure with a defined direction (upstream/downstream) is called a directed rooted tree, a tree on itself is called an acyclic connected graph and a network is called a weighted, directed graph.

the SAT tree does not necessarily include all Nodes and all Links (it is not necessarily a spanning tree)

the SAT tree topology is defined by the routing information from the external Routing Process. The SAT structure is not used to forward or manipulate traffic, it is only used to account traffic flows.

An Edge SAT as the same SAT tree structure as defined above, with the difference that the SAT Root Node (SRN) is a particular Edge Node (not a Transit Node) and that there is one DAS set for all traffic destinations on all Edge Links at that Edge Node (there are no individual Edge-SATs per Edge-Link). Therefore, a Domain has as many SAT Trees as the number of Transit Links plus the number of Edge Nodes.

Figure 11:
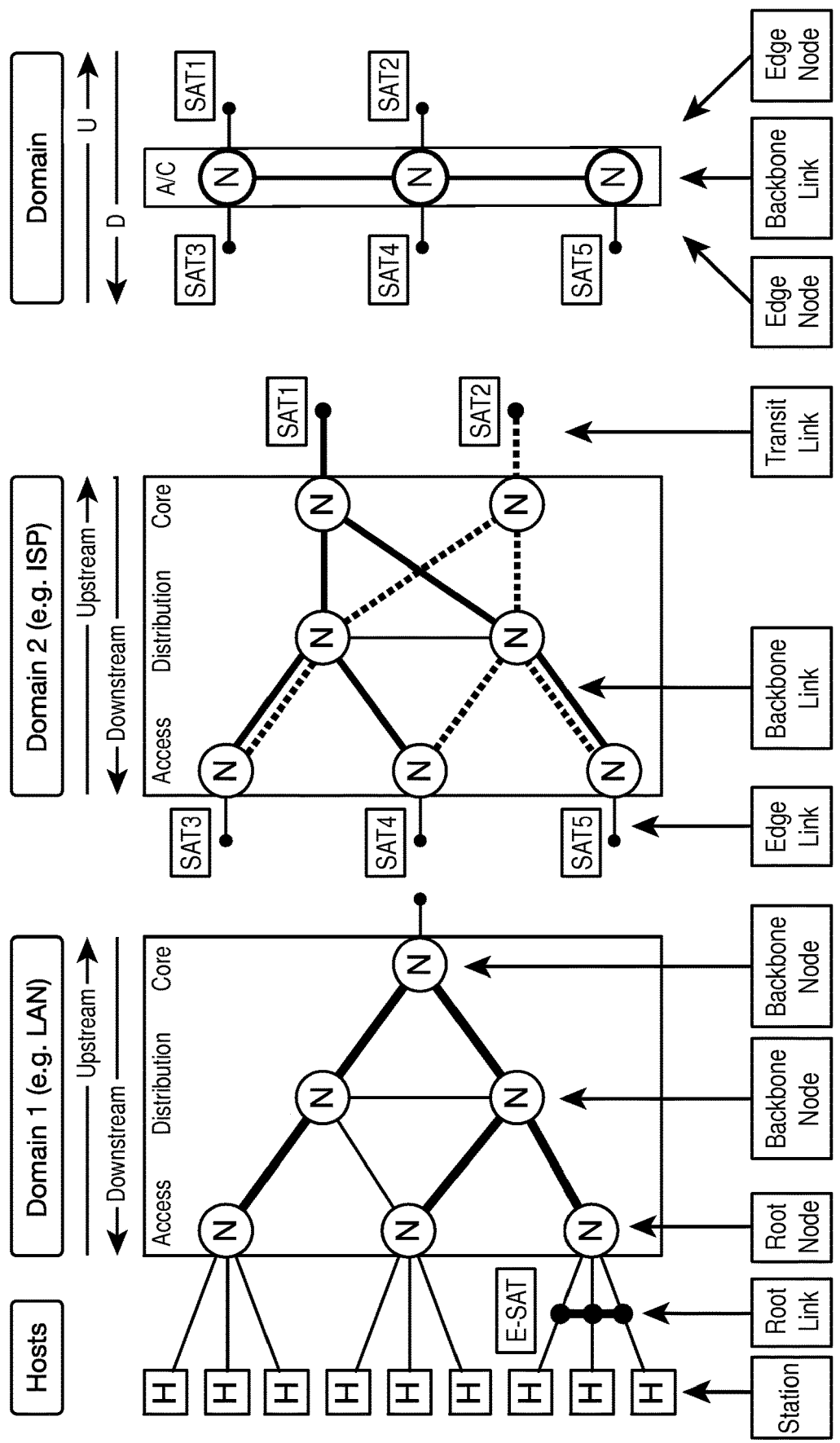
Figure 12:
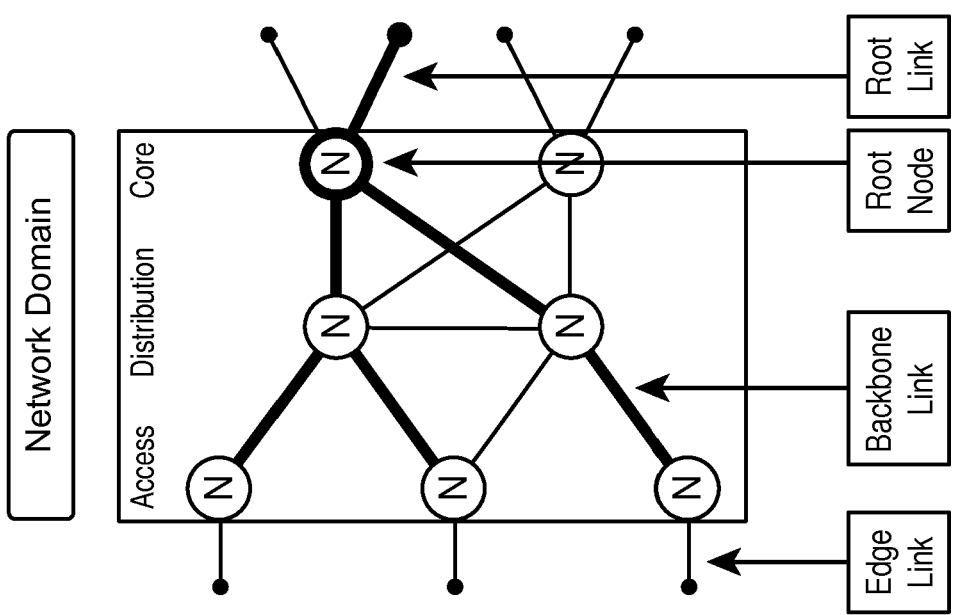

FIG. 11 schematically illustrates an Edge-SAT (left) and all possible 5 SAT trees (middle and right). The purpose of the SAT Tree is to enable internal and scalable accounting with ultimately the goal to manage the resource-sharing of the traffic capacity of all external Links (all Transit Links plus all Edge Links) of that Domain, as further illustrated in FIG. 12.

Each SAT Root Node (SRN) (which is a Transit or Edge Node) will define a unique DAS Set Version Number (DASVN). This DASVN will initially be set to 1 (not to 0 which indicates an invalid or absent DAS set, such as the case of a link down) and incremented (cyclically) for each change in the DAS set, which allows Edge-Node to be triggered and update (download) this DAS set.

The SAT identifier (SATID) is defined as the highest unicast IP address taken from the DAS set. Note that this SATID IP address need not to be reachable and is (probably) not terminated (destination) inside the Domain.

In addition to the SATID, the Transit Node will also define a SAT Priority Level (SATPL), which is a number equal to the network mask (number of mask bits) of the routing entry of which SATID address is part and if there are multiple routing entries the most specific (highest/longest network mask) is selected. This SATPL is send together with the SATID in the SAT-ND process and used to resolve the conflict where multiple Transit Node initially claim to be root of a SATID tree where a higher SATPL wins. If multiple Transit Nodes compete with the same SATID and SATPL, then the highest RootID wins.

The invention assumes that all. Routes in the DAS set are consistent, meaning all traffic with a destination address that is part of the DAS set will follow the same paths in the entire Domain. The invention also assumes that the NodeID of any Node in a particular SAT tree will follow the same path (routing) as the SATID IP addresses of that SAT tree.

Also note that the invention assumes the Routing System to be symmetrical, meaning that the path forward traffic takes is the same path as the reverse/return traffic (with the source and destination address reversed) takes. For this reason, we call the SAT structure 'symmetrical' or 'bidirectional'. The same SAT methods and algorithms can apply if the Routing System is asymmetrical, in which case all SAT are constructed 'unidirectional' (which would double all SAT messages, stored data and calculations).

The choice for the SATID IP-address is important, because any Node can use this SATID to find the Next-Hop Address (NHA) in the local Routing table (as defined by the external Routing Process) and this way define its Upstream SAT Node (USN) in the SAT tree structure.

All Nodes will keep a Local Database of its (one) Upstream SAT Node (USN), and all of its Downstream SAT Nodes (DSN). A Downstream SAT Node (DSN) is a Node that confirmed (by UDISC message) to its Upstream SAT Node (USN) that the USN has passed the UNC check. The Routing System is assumed to be stable (converged) and loop-free. When a Transit-Link has become unavailable (link down), then the Transit-Node will start the Clear SAT Procedure (CSP).

When a SAT Root Node (SRN) detects that its Upstream SAT Link (USL) is down or when a Backbone stopped receiving DDISC updates from its Upstream SAT Node (USN), then this Node will conclude that it is cut-off from this SAT structure and it will start the Clear SAT Procedure (CSP). The goal of this procedure is to delete the SAT definition in the local Databases of all Downstream Nodes.

When a SAT Root Node (SRN) detects the DAS set has changed such that the SATID of this SAT has changed, then for the previous SAT is concluded 'removed' and the CSP procedure is started. For the new SATID and the new SAT will be created (from the SRN).

When any Node detects that the Routing Table has changed such that the NHA of any address in the DAS set in a SAT structure has changed or the NHA of the USNID, then it will start the CSP procedure for this SAT and only when the Routing Process has converged (stable) a new SAT will be created (from the SRN).

For all of these purposes, the Node that starts the CSP procedure for a specific SAT (specific SATID), will do subsequently:
1. Mark. DASVN=0 in its own Local Database and start the Discovery Hold Time (DISHT) timer (DISHT is recommended to be 8×DISIT).
2. During this DISHT time, it will send DDISC messages with DASVN=0 at DISIT intervals.
    a. If this Node is the SAT Root Node (SRN), these DDISC messages are send in the normal DISIT interval.
    b. If this Node is a Backbone Node, it will originate its own DDISC messages at DISIT intervals, as if did receive DDISC messages from its USN. It will also increment the DISVN at every DISIT interval.
3. After the DISHT this Node will permanently delete the SAT entry in the Local Database and stop the CSP procedure.

When a SAT Root Node (SRN) finds the Transit/Edge Link to be up again, where it had gone down before, and therefor the same SAT definition is active again, then it treat this SAT the same as a new SAT at boot/startup time and start to send DDISC messages for this SAT. When downstream nodes are still in the CSP procedure or have just finished is, they will just learn of this SAT new again and add it to their database as normal.

Figure 13:
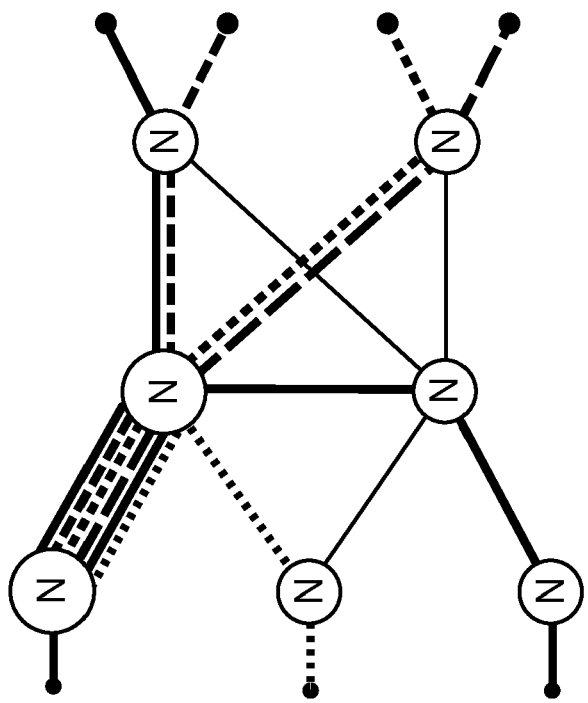

FIG. 13 schematically illustrates all possible Paths starting from a particular Edge-Node in a given example. We define a Path in the Network Domain as sequence of Internal Links that spans from an Edge Node to a SAT Root Node (SRN) (either Transit or Edge Node).

The Path is decided by the Routing Process (external to the invention) A path is a loop-free connected series of nodes and links (math: a 'walk' in the tree). In this disclosure, we consider a Path to be 'spanning', which means it terminates between a Edge Node and a Transit Node in a particular Network Domain. Note that the number of Paths from an Edge-Node in a Network Domain equals the number of SATs trees, which is equal to the total number of Transit-Links plus the number of Edge Nodes minus 1.

To enable scalable CAC at the Edge Node, the Edge nodes need to establish a tree, which spans from all edge nodes to a each Transit link, which we call a SAT tree. The setup of a SAT tree is dynamic and automatic. The links/paths chosen to be in the tree are determined by the routing state (which is determined from an independent routing process). The SAT tree will also automatically re-setup and adapt when the topology changes (such as a node or a link go down or up).

The SAT setup (discovery) process happens using messages (signaling) between the nodes in a hierarchical way. An a per node (per hop) basis and periodically each node sends a Resource Update (RUPM) message to all its neighbors.

As a result of the SAT Discovery process, each transit link of the network domain results in a separate SAT tree, which connect all edge nodes. Most links will carry multiple SATs, especially the backbone links close to the edge nodes.

A process is defined to extend SAT structures from upstream network domains. The same RUPM messages are used to signal the TA (Traffic Accounting) of each link, which is a stepwise upstream process. Next there is a stepwise downstream signaling process (again using the same RUPM messages) to determine the available traffic capacity on a per. SAT basis. The result is that every edge node has a list of paths leading to each transit link, following the tree structure. And this particular property enables the edge node to do (near) real-time CAC.

Neighbour Discovery

The SAT Neighbour Discovery or SAT-ND Algorithm defines DDISC and UDISC messages. These message are together called DISC messages. Preferably DISC messages are sent independently of Resource Update or RUPM messages, as discussed with reference to FIG. 16 below.

Figure 14:
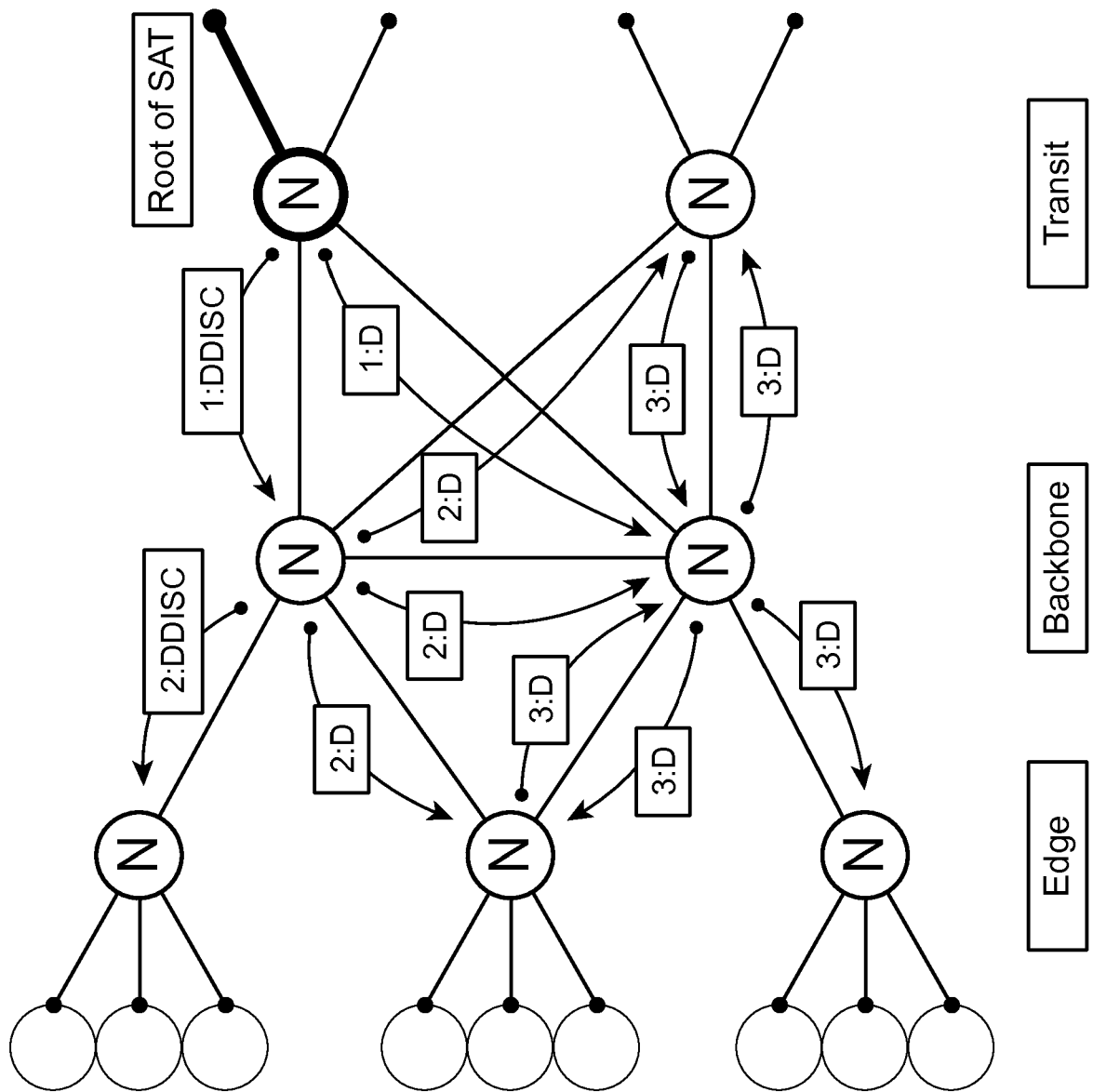

FIG. 14 schematically illustrates DDISC messages or Downstream Discovery messages as sent from a SAT Root Node (SRN) to all Downstream Nodes. The DDISC message are flooded, starting from a SAT Root Node (SRN) and sent to all Downstream Nodes. Each DDISC message has a unique Neighbour Discovery Message Version Number (DISVN), which is used to prevent loops in the flooding mechanism and to identity matching UDISC reply messages.

Backbone Nodes that receive a DDISC message will keep record of the DISVN and unless this DISVN was received before on another Link, it will forward the DDISC message onto all of its Links except the Link on which the message was received. The DDISC destination address is a Multicast address in order to reach any Neighbour Node on each Link, which can be the case on Multiple Access networks, like Ethernet or NBMA. If an Edge Node also has Backbone Links, it will forward the DDISC message the same way. For each SAT tree, a separate DDISC message is send, because the topology of each SAT can (and will) be different.

The DDISC message has a Domain ID (DOMID) field, which is a unique number for the current Network Domain and is formatted as an IP address (which need not to be reachable). The DOMID is configured by the operator and needs to be the same on all Nodes. The DOMID is used in all SAT messages.

The DDISC message has a SAT ID (SATID) field, which is calculated to be the highest unicast IP address from the DAS set.

The DDISC message has a Root ID (RootID) field, which is the NodeID from the SAT Root Node (SRN) of the SAT tree. Note that the RootID is not the same as the SATID.

The NodeID is an IP address of a Node, that is configured by the operator (it needs to be an interface IP address on that Node, typically a loopback interface). A NodeID must be unique and must be reachable.

The DDISC message has a Source NodeID (SourceID) field, which is the NodeID of the Node that has sent the DDISC message. Note that this SourceID is not necessarily the same as the Source Address in the IP header (specifically when the Node uses an Loopback IP address as its NodeID).

The DDISC message has a Root Count (RootCNT) field, which is the number of hops from this Node to the Root Node. The SAT Root Node (SRN) will initialize the RootCNT to 1.

The DDISC messages are sent periodically with Discovery Interval Time (DISIT). (DISIT is recommended to be between 0.1 and 10 seconds and default 1 second).

Each DDISC message has a unique DISVN, which is incremented (cyclically), to notify the Downstream Nodes of its existence and the 'Up' status of the SAT Root Node (SRN) and Links, which is the root of the constructed SAT Tree and the destination of all traffic that is send to this Link.

When an Backbone Node receives a DDISC message, it will first directly response with a UDISC message (because of the latency measurement discussed later) and then construct a new DDISC message that will have the same DISVN, DOMID, SATID, RootID, SATPL and DASVN numbers as the received. DDISC message, but an incremented (cyclically) RootCNT and an updated. SourceID (its own NodeID).

If a SAT Root Node (SRN) has an updated DAS table (caused by a routing process update), it will increment (cyclically) the DASVN in the next periodic DDISC message for this SAT Tree, signaling the Edge Nodes to download this new DAS table.

If a new DAS table causes the SATID to be different, then the SAT Root Node (SRN) will start the CSP procedure.

If a SAT Root Node (SRN) finds a Transit Link to go "Down", or in the case of an Edge-SAT if all of its Edge Links go "Down", the SAT Root Node (SRN) will start the CSP procedure.

If a Node has received DDISC messages for a specific SATID from a Upstream Node and at some moment this Node stops receiving DDISC messages from this Upstream Node for a Discovery Maximum Time (DISMT) (DISMT is recommended to be 4×DISIT) and this Upstream Node is still considered Upstream (by the UNC check) then this Node will assume it is cut-off from this SAT tree and start the CSP procedure.

Figure 15:
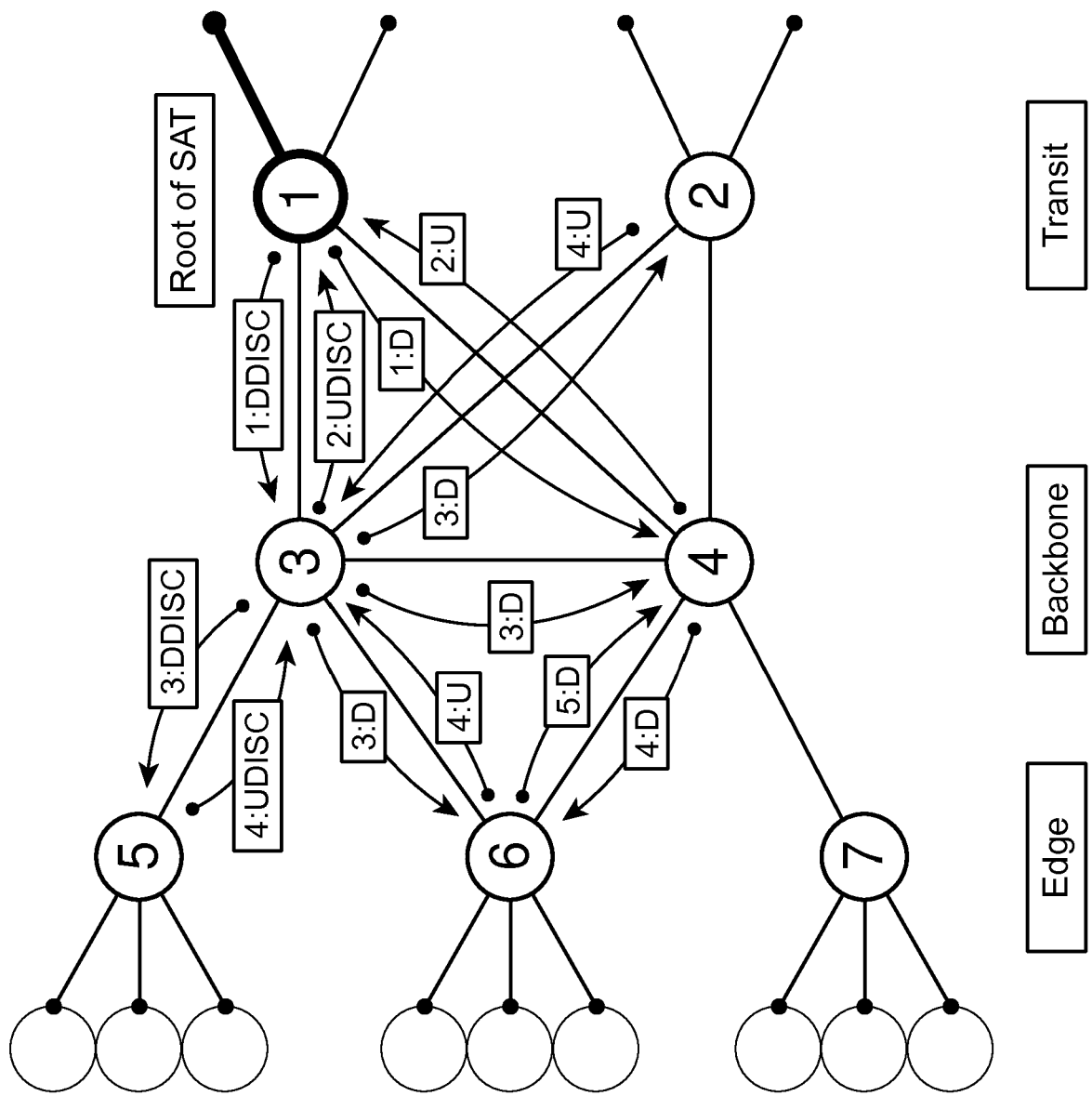

FIG. 15 schematically illustrates UDISC or Upstream Discovery messages as sent from an Edge/Backbone Node to its Upstream Node. The UDISC message is send directly by any Node when it receives a DDISC message and the UDISC message is sent back to the sender of the DDISC message, but only if the sending Node of the DDISC message is accepted as its Upstream Node by the Upstream Node Check (UNC).

A Node will accept a Neighbour Node to be an. Upstream Node when the SATID in the DDISC message is found to have the same Next-Hop Address (NHA) in the Routing Table as the SourceID of the DDISC message. This property ensures a proper Tree structure. If the SATID and next-hop address are not the same, the Node is not accepted as Upstream Node and no UDISC message is sent back.

Using this UDISC response criteria, the resulting SAT tree is guaranteed to be loop-free, spanning to all Edge-Nodes and rooted at the SAT Root Node (SRN), where the SATID is derived to be an (highest) address in the DAS set of the Transit-Link. Note that the SAT tree is not necessarily spanning all. Nodes in the Domain.

The UDISC message will carry the same DISVN number as seen in the DDISC message that it responds to. The Node will insert its own NodeID as SourceID and also the DomID and SATID are copied from the DDISC message.

The sending Node will also insert the Edge Count (EdgeCNT) (the number of hops from this Node to the Edge-Node) in the UDISC response, which is number of hops from the furthest Edge-Node;
If this Node is a Backbone Node with no Edge Links and it has not yet received an EdgeCNT from a Downstream. Node, it will use EdgeCNT=0 (which means "unknown").
If this Node is an Edge Node, it will use EdgeCNT=1.
If this Node did receive an EdgeCNT number from one or more Downstream (Child) Nodes, it will use the lowest EdgeCNT number and increment it by one as the sending EdgeCNT.

When an Backbone Node receives a UDISC message with EdgeCNT>0 from a Downstream Node and this Backbone Node had a value of EdgeCNT=0 before this message, or the message.EdgeCNT is lower then this Node.EdgeCNT, then this Node will directly send a (new) UDISC message with the new message.EdgeCNT incremented by 1 to its Upstream Node using the same message.DISVN. Note that this Node already send an UDISC message with this DISVN value using the old EdgeCNT value. Also note that this Node will reply future DDISC messages (with incremented DISVN values) also with this new EdgeCNT value. This 'gratuitous' UDISC message is sent to inform all Upstream Nodes up to the SAT Root Node (SRN) of the EdgeCNT distance.

Note that Backbone Nodes will keep sending EdgeCNT=0 to their Upstream Nodes, until the flooded DDISC messages have reached the (nearest) Edge Node and then until the reflected UDISC message with EdgeCNT>0 have reached this Backbone Node.

Note that some Backbone or Transit Nodes will never received a EdgeCNT>0 UDISC message and are therefor not selected to be part of the SAT tree. These non-member Nodes will however keep sending DDISC and UDISC messages.

Only upon reception of an EdgeCNT>0 UDISC message, the sending Node will be accepted as valid Downstream Node in the receiving Node.

In each SAT the DISC messages are also used for continues measurement of the Hop Latency on a per-link basis. For this reason, the UDISC response needs to be send back as fast as possible directly after anytime a DDISC message is received.

Each SAT Root Node (SRN) keeps periodically sending DDISC messages, in order to:
continually test if Neighbour Nodes and their connecting Links are active,
continually notify all Downstream Nodes that the SAT tree is active and if the DAS set is stable or has changed (by signaling the DASVN number),
continually measure the Hop Latency for all Internal Links.

When an Edge Node receives a DDISC message and it determines it is part of a new SAT tree, or when the SAT tree was already known (by SATID) but it finds the DASVN to be incremented (signaling there is an updated DAS set at the SAT Root Node, SRN), this Edge Node will contact the Root Node (which is the RootID in the DDISC message) to download the latest DAS set. This DAS Download is outside of this SAT algorithms scope.

Resource Updates

Figure 16:
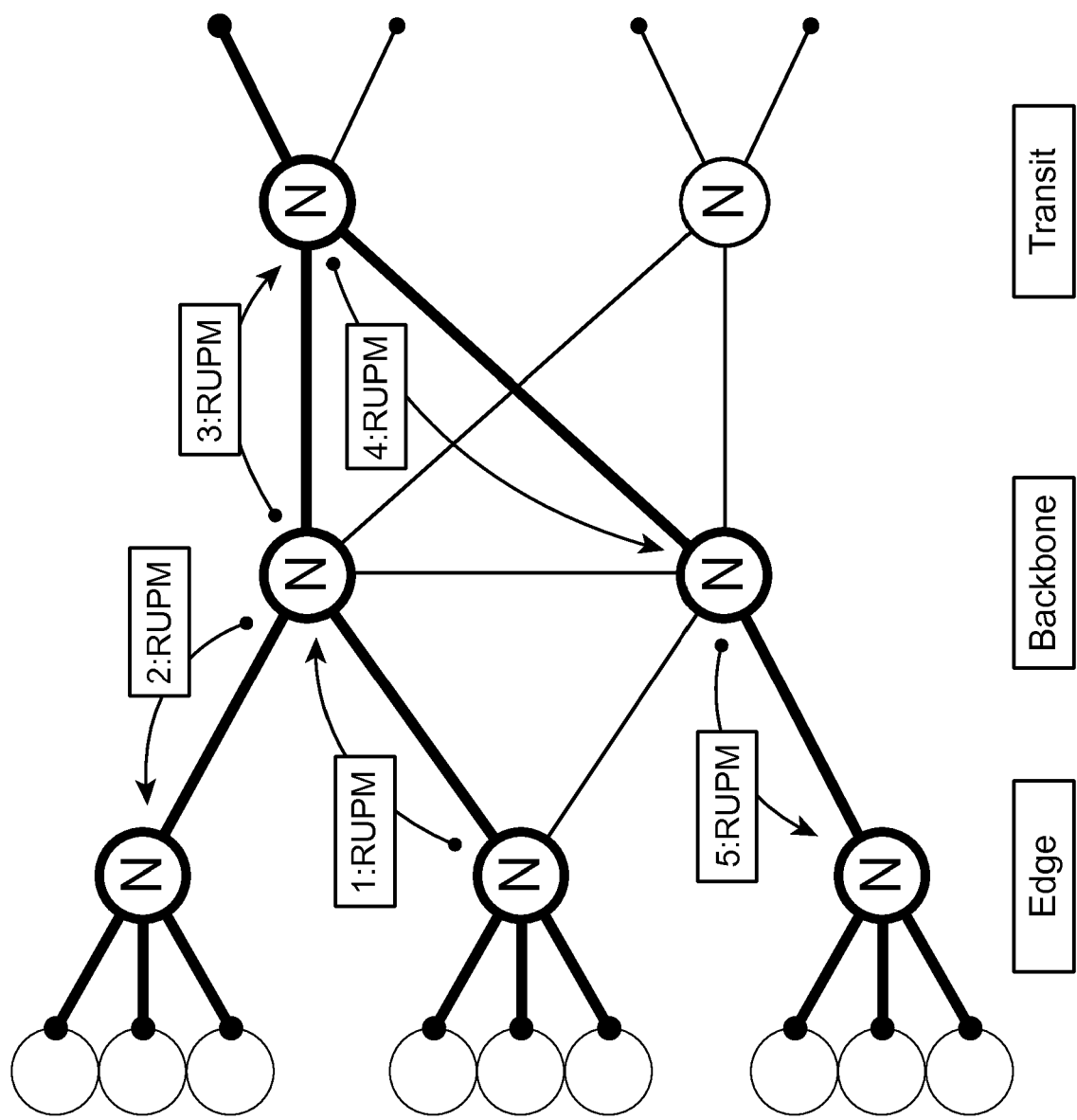

FIG. 16 schematically illustrates Resource Update Messages or RUPM interactions (time-sequence based). RUPM messages are sent from any Node to update its Neighbours (Upstream and Downstream) Nodes. The goal for the SAT Resource Management or SAT-RM algorithm is for each. Node part of a SAT tree:

to have a Local-Database that represents "the available and reserved Resources" of the all Paths (all SATs)
to use this database to independently (without consulting other Nodes, this is a key feature) decide whether to accept or deny new traffic reservations,
to register Traffic Reservations in the Local Database,
to update the local Resource Capacity Data (such as local. Link Capacity) in the Local Database,
to send an RUPM message to update the rest of the Network when there is any change in either Reservations or Capacity.

Because of the SAT tree structure, an. Update message from a Node is received by its Upstream Node, which in turn will send Update messages to all of its (other) Downstream Nodes and its Upstream Node.

Any Node that has a change in its Local Database, which is either caused by an external message (such as incoming RUPM messages or a Traffic Registration from Subscribers) or caused by a local change (such as expired Traffic Sessions or changes in local Resource Data), will set its Resource Update Flag (RUPF).

Nodes will send RUPM messages on a fixed periodic interval, called Resource Update Interval Time (RUPIT), but only when the RUPF flag is set. Multiple changes can be consolidated into one RUPM message and when there are no changes, no RUPF flag is set and no RUPM message is sent.

Figure 17:
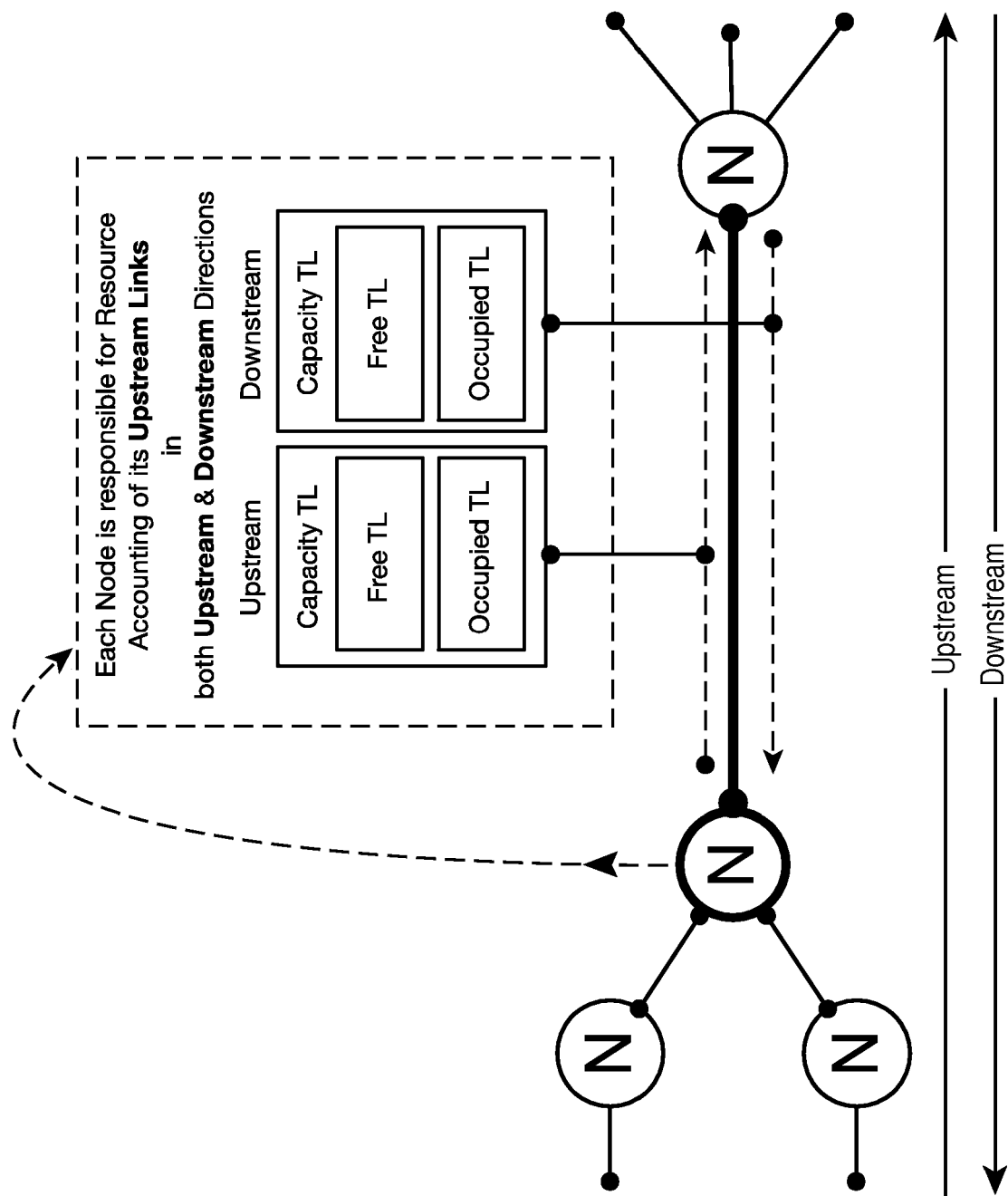
Figure 18:
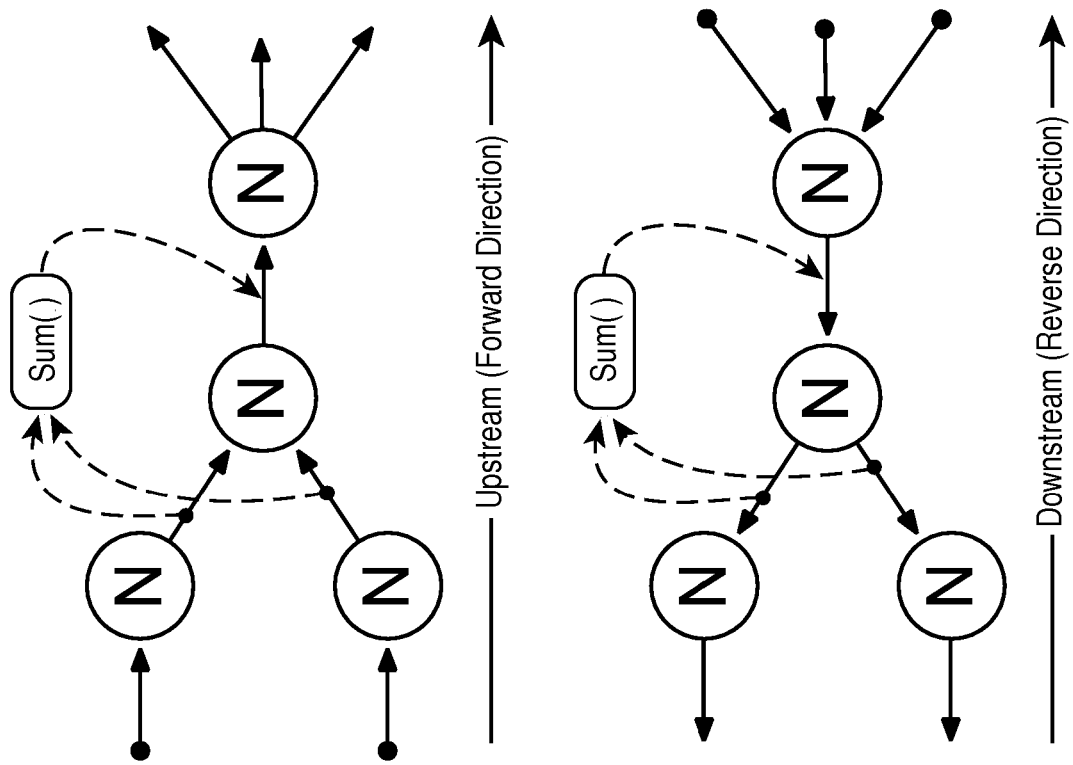

As illustrated in FIGS. 17 and 18, an important principle of the invention is that each Node is responsible for the accounting of its Upstream Link only. This Local Link accounting is done for Traffic Flows in both Directions on that Link (so both Upstream and Downstream Traffic Flows). In implementations of the invention, the Upstream and Downstream Traffic Flows are accounted independent of each other.

Each Node keeps a Local-Database that holds a local Resource Management Database (RMDB), which keeps all data that are necessary for the Module Aggregation functions:

For each SAT structure, the Upstream Link Resource Data,
For each SAT structure, the Upstream Path Resource Data, which is the aggregated data of all. Upstream Nodes/Links,
For each Neighbour Node, the last incoming RUPM message.

This information is used to construct and send RUPM messages to its Neighbours and the received RUPM message can update the Database.

The SAT-RM algorithm supports the accounting of multiple Resource Types called Resource Modules. The SAT-RM algorithm is defined to be extensible and to allow 'pluggable' Resource management. Some Resource Modules that we regard as useful for the generic Traffic Reservation process (this process is not defined in this disclosure):

1. Traffic Load
2. Subscriber Count
3. Hop Latency

In the SAT-RM algorithm each Module independently defines its variables and its aggregation functions that operate in these variables, e.g. addition or averaging. RUPM messages are originated by any Node, when there is a change in either the Reservation of Resources (typically at the Edge Nodes) or a change in the Resource Capacity at any Node, such as a change in:

Bandwidth Capacity (CTL)
Static/Proportional Hop Latency (SHL/PHL)
Subscriber Count (ASC/ISC)

After detecting this change, all Module Aggregation functions are started and a new RUPM message is constructed and sent. RUPM messages are sent no more frequent than the (Domain) global minimum "Resource Update Interval Time" (RUPIT). Multiple changes can be summarized and delayed in one RUPM message. The RUPM message will carry the NodeID of the Edge Node and a unique Resource Update message Version Number (RUPVN). A (single) RUPM message contains all Resources data of all Modules and for all SATs. RUPM messages are not send on a per-SAT basis.

When a Node receives an incoming RUPM message, it will start the same Module Aggregation functions and construct and send a new RUPM message.

SAT-ND Algorithm

The SAT Neighbour Discovery or SAT-ND algorithm is a key aspect of the invention. The SAT-ND algorithm will now be described more fully in the form of pseudocode, i.e. an informal high-level description of the operating principle of a computer program or an algorithm.

First, some definition for Data Structures and Routines that are common for the SAT-ND and SAT-RM algorithms:

```
// ------+++-----------+++-----------+++-----------+++------------+++------------+++------
// COMMON Data Structures and Routines for the SAT-ND and SAT-RM algorithms
STRUCT Domain          // configured by operator (defaults shown here):
   DomID = <unique_number_in_IP_address_format>
   // SAT-ND global constants:
   DISIT = 1 seconds        // Discovery Interval Time
   DISMT = 4 seconds        // Discovery Maximum Time (4x DISIT)
   DISHT = 8 seconds        // Discovery Hold Time (8x DISIT)
   // SAT-RM global constants:
   RUPIT = 0.2 seconds   // Resource Update Interval Time (not related to DISIT)
END STRUCT
STRUCT Link
   status: Up | Down
   topology   :Edge | Backbone | Transit
   medium:P2P | P2MP    // P2MP example: Ethernet broadcast domain
   duplex :HD | FD       // Half Duplex example: Wi-Fi (bandwidth shared up/down
END STRUCT
```

```
STRUCT Node
    NodeID = <unique_reachable_IP_address>
    Links[LinkID]    // pre-poluated list of all Links attached to this Node
    NDDB.SAT[SatID]      // Neighbour Discovery (SAT-ND) Database
    RMDB.Link[LinkID]    // Resource Management (SAT-RM) Database keeping per-
Link info
    RMDB.SAT[SatID]      // Resource Management (SAT-RM) Database keeping per-
SAT info
END STRUCT
STRUCT NDDB.SAT          // defined globally as SAT-RM needs to read this DB
    SatID       : IP_address
    DISVN       : Number
    UpdateTime  : Time
    DeadTime    : Time
    SATPL       : Number
    RootID      : IP_address
    DAS         : set_of[IP-prefix]
    DASVN       : Number
    UNID        : IP_address                // Upstream Node ID
    DNID[ ]     : set_of[IP_address]        // Downstream Node ID(s)
    UpLink      : LinkID                    // Link on which Upstream Node is seen
    RootCNT     : Number
    EdgeCNT     : Number
END STRUCT
// ------+++------------+++------------+++------------+++------------+++------------+++------
```

A particular embodiment of the SAT-ND algorithm may now be described as follows:

```
// ------+++------------+++------------+++------------+++------------+++------------+++------
// Data Structures for the SAT-ND algorithm
STRUCT message_DDISC
    DISVN           : Number
    DomID           : IP_address
    SatID           : IP_address
    SourceID        : IP_address
    SATPL           : Number
    DASVN           : Number
    RootID          : IP_address
    RootCNT         : Number
END STRUCT
STRUCT message_UDISC
    DISVN           : Number
    DomID           : IP_address
    SatID           : IP_address
    SourceID        : IP_address
    DASVN           : Number   // notify upstream of learned DAS change, or CSP
    EdgeCNT         : Number
END STRUCT
// ------+++------------+++------------+++------------+++------------+++------------+++------
// SAT-ND Algorithm
SUB start_mainloop_SATND( )
    initialize_NDDB( )
    tell_OS_ReadyForMessages( )
    LOOP
        nextDiscTime = currentTime( ) + Domain.DISIT
        FOREACH message IN Received_Messages( ) DO
            process_received_message(message)
        END FOREACH
        check_Status_change_of_Links( )
        check_Timeout_of_all_SATs( )
        check_DAS_change_of_SATs( )
        send_DDISC_messages_all_SATs( ) // at DISIT time intervals
    END LOOP
END SUB
SUB initialize_NDDB( )
    FOREACH LinkID IN Node.Links[ ] DO
        IF Link.topology == Transit THEN
            Node.Roles.addEntryToSet(Transit)
            newSat = createRootSAT(Link, SatID=<empty>)
            Node.NDDB.SAT.addEntryToSet(newSat)
        END IF
        IF Link.topology == Edge THEN
            Node.Roles.addEntryToSet(Edge)
        END IF
    END FOREACH
```

```
        IF Node.NodeID == Domain.RefNode AND NOT
Node.NDDB.SAT.checkExists[RefID] THEN
            newSat = createRootSAT(Link=<empty>, SatID=RefID)
            Node.NDDB.SAT.addEntryToSet(newSat)
        END IF
        IF Node.Roles.hasMember(Edge) THEN
            newSat = createRootSAT(Link=Edge, SatID=<empty>)
            Node.NDDB.SAT.addEntryToSet(newSat)
        END IF
END SUB
```

```
SUB createRootSAT(Link, SatID) RETURNS newSat
    IF SatID == <empty> THEN
        IF Link == "Edge" THEN
            newSat.DAS = extractDestinationsFromRoutesForEdge( Node.Routes )
            newSat.RootLinks.addEntryToSet( Node.Links.selectFromSet( topology=Edge
) )
        ELSE
            newSat.DAS = extractDestinationsFromRoutesForLink( Node.Routes, Link)
            newSat.RootLinks.addEntryToSet(Link)
        ENDIF
        newSat.SatID = findHigestUnicastIP( SAT.DAS )
        newSat.SATPL = extractNetmaskFromRoutesForAddress( Node.Routes,
newSat.SatID)
    ELSE
        newSat.SatID = SatID
        newSat.SATPL = extractNetmaskFromRoutesForAddress( Node.Routes,
newSat.SatID)
        IF newSat.SATPL == <empty> THEN
            newSat.SATPL = maxNetmaskForIPspace( )
        END IF
        newSat.DAS = extractDestinationsFromRoutesForLink( Node.Routes, Link)
        newSat.RootLinks = <empty>
    END IF
    newSat.DISVN = 0
    newSat.UpdateTime = currentTime( )
    newSat.DeadTime = 0
    newSat.RootID = Node.NodeID
    newSat.UNID = <empty>
    newSat.DNID[ ] = <empty>
    newSat.UpLink = Link
    newSat.RootCNT = 1
    newSat.EdgeCNT = 0
END SUB
SUB process_received_message( )
    message.sourceLink = determine_Link_of_Received_Message(message)
    IF check_DISC_message_isValid(message) THEN
        IF message.type == DDISC THEN
            IF check_Message_UpstreamNode_UNC(message, Node.Routes) THEN
                updateDB_from_DDISC_message(message)
                send_UDISC_message_to_UpstreamNode( ) // reply asap for latency
measurement
                FOREACH Link IN Node.Links EXCEPT Link == message.sourceLink DO
                    newDDISCmessage = construct_DDISC_message(SatID)
                    send_Message_on_Link_by_MultiCast( newDDISCmessage, Link )
                END FOREACH
            END IF
        END IF
        IF message.type == UDISC THEN
            IF message.EdgeCNT > 0 THEN
    Node.NDDB.SAT[message.SatID].DNID[ ].addEntryToSet(message.SourceID)
                IF Node.NDDB.SAT[message.SatID].EdgeCNT == 0
                    OR
                    message.EdgeCNT < Node.NDDB.SAT[message.SatID].EdgeCNT
                THEN
                    Node.NDDB.SAT[message.SatID].EdgeCNT == message.EdgeCNT
                    send_UDISC_message_to_UpstreamNode( ) // send gratuitous msg to
updte EdgeCNT
                END IF
            END IF
        END IF
    END IF
END SUB
```

```
SUB check_DISC_message_isValid(message) RETURNS true|false
    IF NOT message.DomID == Domain.DomID THEN
        RETURN false
    END IF
    IF Node.NDDB.SAT[message.SatID] == <empty> THEN
        IF message.type = DDISC THEN
            RETURN true
        ELSE
            RETURN false
        END IF
    END IF
    IF message.type == DDISC THEN
        IF message.DISVN =< Node.NDDB.SAT[message.SatID].DISVN THEN
            RETURN false
        ELSE
            RETURN true
        END IF
    END IF
    IF message.type == UDISC THEN
        IF message.DISVN =! Node.NDDB.SAT[message.SatID].DISVN THEN
            RETURN false
        ELSE
            RETURN true
        END IF
    END IF
END SUB
SUB check_Message_UpstreamNode_UNC(message, Node.Routes) RETURNS true|false
    nexthopAddressOfSource = get_NHA_from_InternalRouteTable( message.SourceID, Node.Routes )
    nexthopAddressOfSatID = get_NHA_from_InternalRouteTable( message.SatID, Node.Routes )
    nexthopLink = extractNexthopLinkFromRoutes( message.SatID, Node.Routes )
    RETURN (nexthopAddressOfSource == nexthopAddressOfSatID) AND (message.sourceLink == nexthopLink)
END SUB
SUB updateDB_from_DDISC_message(message)
    IF NOT Node.NDDB.SAT.hasMember( message.SatID ) THEN
        newSat = constructNew( type:SAT )
        newSat.DomID = message.DomID
        newSat.SatID = message.SatID
        newSat.DISVN = message.DISVN
        Node.NDDB.SAT.addEntryToSet( newSat )
    END IF
    Node.NDDB.SAT[message.SatID].RootID = message.RootID
    Node.NDDB.SAT[message.SatID].UpdateTime = currentTime( )
    Node.NDDB.SAT[message.SatID].SAT = 0
    Node.NDDB.SAT[message.SatID].UNID = message.SourceID
    Node.NDDB.SAT[message.SatID].UpLink = message.sourceLink
    Node.NDDB.SAT[message.SatID].RootCNT = message.RootCNT + 1
    IF message.DASVN > Node.NDDB.SAT[message.SatID].DASVN THEN
        thisRootID = Node.NDDB.SAT[message.SatID].RootID
        Node.NDDB.SAT[message.SatID].DAS = downloadDASfromRoot( thisRootID )
        Node.NDDB.SAT[message.SatID].DASVN = message.DASVN
    END IF
END SUB
```

```
SUB check_Status_change_of_Links( )
    IF statusHasChanged( Link ) THEN
        SatID = selectFromSet( Node.NDDB.SAT[SatID].RootLinks.hasMember(Link) )
        IF Node.NDDB.SAT[SatID].Links.hasMember( Link ) THEN
            IF Link.status = Down THEN
                Node.NDDB.SAT[SatID].DASVN = 0
                Node.NDDB.SAT[SatID].DAS = <empty>
                Node.NDDB.SAT[SatID].UpdateTime = currentTime( ) - Domain.DISMT
                Node.NDDB.SAT[SatID].DeadTime = currentTime( ) + Domain.DISHT
            ELSE
                newSAT = createRootSAT(Link, SatID=<empty>)
                Node.NDDB.SAT.addEntryToSet(newSAT)
            END IF
        END IF
    END IF
END SUB
SUB check_Timeout_of_all_SATs( )
    FOREACH SatID IN Node.NDDB.SAT[ ] WHERE Node.NDDB.SAT[SatID].RootID =! Node.NodeID DO
```

```
        IF currentTime( ) > (Node.NDDB.SAT[SatID].UpdateTime + Domain.DISMT)
THEN
            Node.NDDB.SAT[SatID].DASVN = 0
            IF Node.topology == Edge THEN
                Node.NDDB.SAT[SatID].DAS = <empty>
            END IF
            IF Node.NDDB.SAT[SatID].DeadTime == 0 THEN
                Node.NDDB.SAT[SatID].DeadTime = currentTime( ) + Domain.DISHT
            ELSE
            IF currentTime( ) > Node.NDDB.SAT[SatID].DeadTime THEN
                deleteEntry( Node.NDDB.SAT[SatID] )
            END IF
        END IF
    END FOREACH
END SUB
SUB check_DAS_change_of_SATs( )
    FOREACH SatID IN Node.NDDB.SAT[ ] WHERE Node.NDDB.SAT[SatID].RootID == Node.NodeID DO
        IF dataHasChanged( Node.NDDB.SAT[SatID].DAS ) THEN
            incrementCyclic( Node.NDDB.SAT[SatID].DASVN )
        END IF
    END FOREACH
END SUB
SUB send_DDISC_messages_all_SATs( )
    IF currentTime( ) == nextDiscTime THEN
        FOREACH SatID IN Node.NDDB.SAT[ ] WHERE Node.NDDB.SAT[SatID].RootID == Node.NodeID DO
            incrementCyclic( Node.NDDB.SAT[SatID].DISVN )
            newDDISCmessage = construct_DDISC_message(SatID)
            FOREACH Link IN Node.Links EXCEPT Link == Node.NDDB.SAT[SatID].UpLink DO
                send_Message_on_Link_by_MultiCast( newDDISCmessage, Link )
            END FOREACH
        END FOREACH
        nextDiscTime = currentTime( ) + Domain.DISIT
    END IF
END SUB
SUB send_UDISC_message_to_UpstreamNode( )
    newUDISCmessage = construct_UDISC_message( )
    send_Message_on_Link_by_MultiCast( newUDISCmessage, message.sourceLink )
END SUB
```

```
SUB construct_DDISC_message(SatID) RETURNS message
    message.DISVN = Node.NDDB.SAT[SatID].DISVN
    message.DomID = Domain.DomID
    message.SatID = SatID
    message.SourceID = Node.NodeID
    message.SATPL = Node.NDDB.SAT[SatID].SATPL
    message.DASVN = Node.NDDB.SAT[SatID].DASVN
    message.RootID = Node.NDDB.SAT[SatID].RootID
    message.RootCNT = Node.NDDB.SAT[SatID].RootCNT
    message.type = DDISC
END SUB
SUB construct_UDISC_message(SatID) RETURNS message
    message.DISVN = Node.NDDB.SAT[SatID].DISVN
    message.DomID = Domain.DomID
    message.SatID = SatID
    message.SourceID = Node.NodeID
    message.EdgeCNT = Node.NDDB.SAT[SatID].EdgeCNT
    message.type = UDISC
END SUB
// ------+++------------+++------------+++------------+++------------+++------
```

Figure 19:
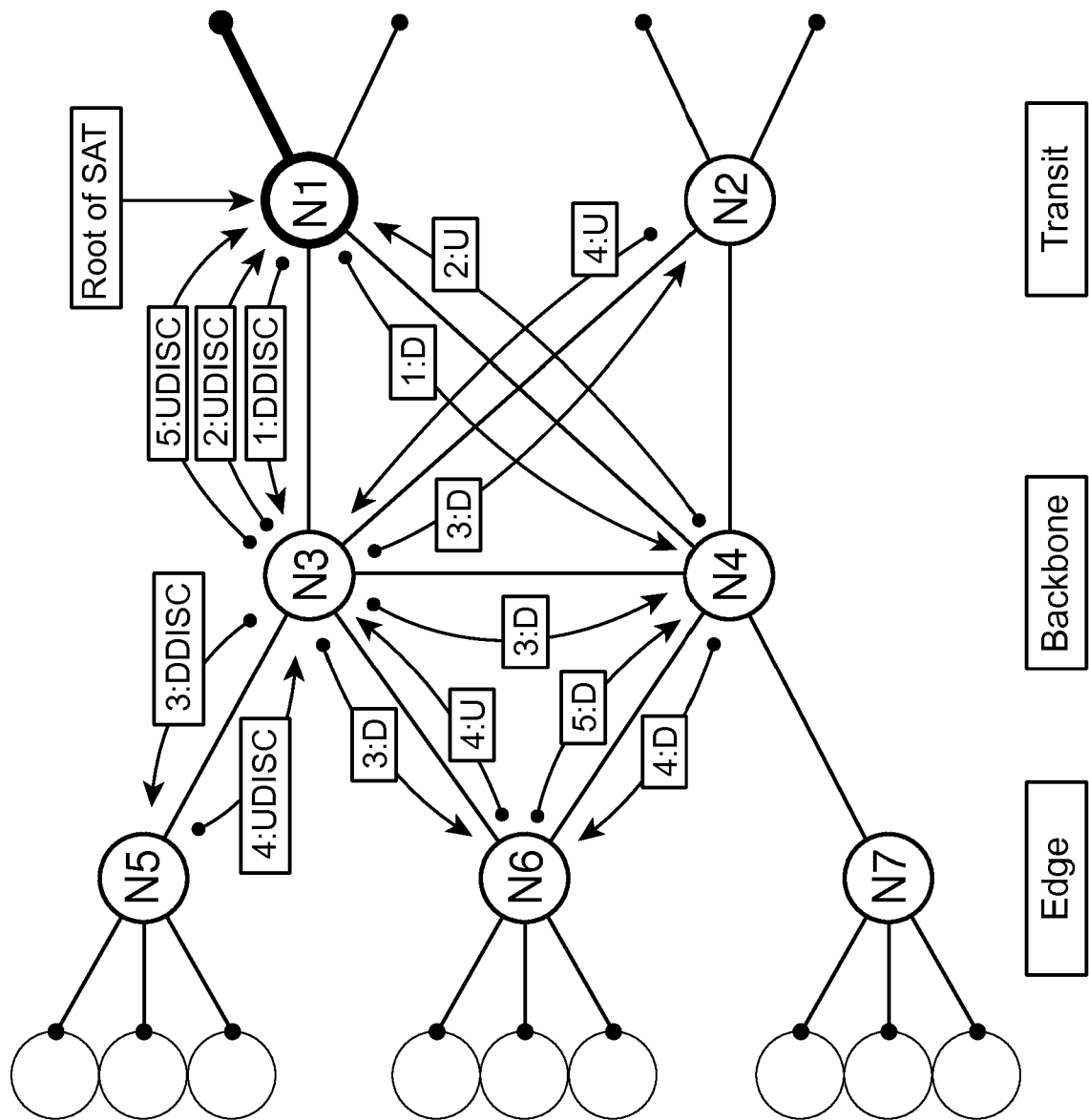
Figure 21:
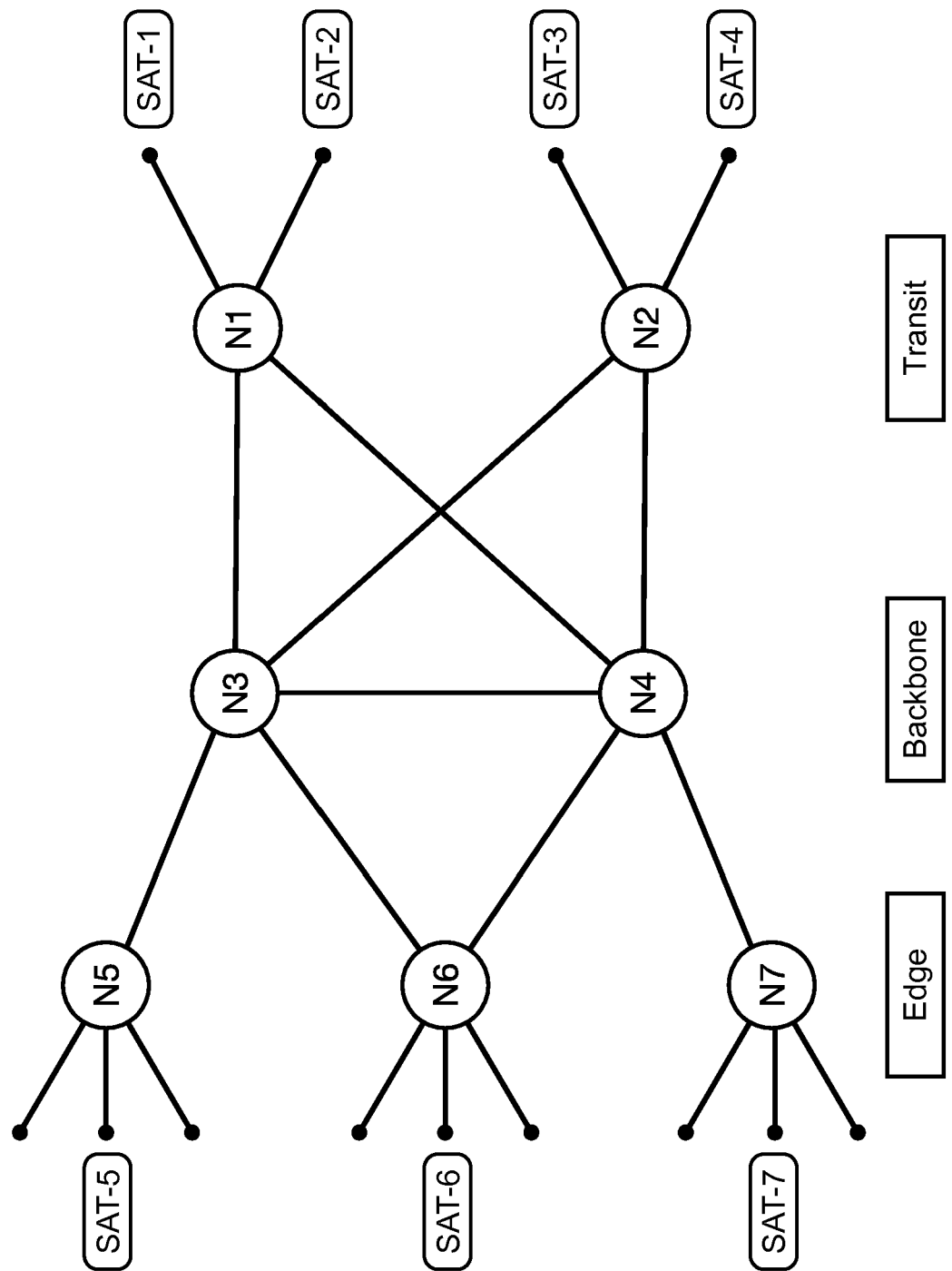

FIG. 19 schematically illustrates the SAT-ND algorithm in the form of iterations and calculations for the example network of FIG. 8. We describe the DDISC messages that originated from the Root Node at time=1 up to the last UDISC reply message at time=5 in the table of FIG. 20. The result is the SAT-ND for all possible SAT's in a Topology in FIG. 21, and in the table of FIG. 22.

In the table, the following abbreviations are used:
S1UN=SAT-1 Upstream Node
S1DN=SAT-1 Downstream Node(s)
RN Root Node (does not have Upstream Node)
EN=Edge Node (does not have Downstream Nodes)
SAT-RM Algorithm As explained above, the SAT-RM algorithm provides for sending an RUPM message to update the rest of the Network when there is any change in either Reservations or Capacity.

SAT-RM provides for an advantageous way to inform all Leaf Nodes efficiently on resource data changes within a given network domain by only informing of changes in trees they are member of. Generally speaking, this involves three steps.

In step 1, for each edge node in the domain a respective SAT or spanning tree is constructed that connects said edge node, as a root node of said tree, to all other edge nodes, as leaf nodes in the domain. This SAT tree identifies for each node other than said edge node in said tree a single upstream neighbour node and zero or more downstream neighbour nodes. See above under FIG. 10 and further.

In step 2, any node in the domain monitors changes in resource data (such as increase or decrease in network load, transmission capacity or bandwidth capacity) related to all SAT trees it is a member of. A node may be member of plural SAT trees and resource data may be different for each tree. If a change occurs, the node will send a message to update each of its upstream and downstream neighbours in that spanning tree on said change.

In step 3, each such upstream and downstream neighbour will calculate an impact of said change to its own resource data and will send a message to update each of its upstream and downstream neighbour in t spanning tree on said impact. Preferably, the neighbor that is the node of step 2, i.e. the node that initially reported the change, avoids recalculating the impact of such impact, as that could introduce feedback loops. Resource data updates may be aggregated, preferably using a data type-specific action.

The messages of steps 2 and/or 3 may be accumulated into combined messages carrying all resource data that belongs to all SAT tree structures. Instead of sending a message for each update, updates are accumulated over spanning trees and sending the accumulated updates to all upstream and downstream nodes of said node. The combined message are sent at predetermined intervals such as once per second.

In the form of pseudocode the SAT-algorithm may be expressed as follows:

```
// ------+++------------+++------------+++------------+++------------+++------------+++------
// Data Structures for the SAT-RM algorithm
STRUCT Node
    RMDB.LNK[ ]                            // RM Database for all Node.Links
    (key=LinkID)
    RMDB.SAT[ ]                            // RM Database for all NDDB.SATs
    (key=SatID)
    RMDB.MSG[ ]                            // RM Database for all incoming Messages (key=NodeID)
END STRUCT
STRUCT Defined_Modules
    Module[TraffLoad]                      // Traffic Load registrations
    Module[HopLateny]                      // Hop Latency
    Module[UserCount]                      // numbers of active Users (Subscribers, unique IP-addresses)
END STRUCT
STRUCT RMDB.MSG// RM Database for all incoming Messages (either DN/UN of
each SAT)
    NodeID : <IP_address>                  // msg. SourceID of incoming message
    RUPVN              : Number            // msg.RUPVN of last incoming message
    Module[ ].SAT[ ].Link.variables
    Module[ ].SAT[ ].Path.variables
END STRUCT
STRUCT RMDB.LNK// RM Database for all Node.Links
    LinkID                                 : <LinkID_type>
    Module[ModName].variables              : <per_Module_defined_variables>
END STRUCT
STRUCT RMDB.SAT // RM Database for all NDDB.SATs
    SatID                                  : IP_address
    Module[ModName].variables              : <per_Module_defined_variables>
    Module[ModName].aggregate( ) : <per_Module_defined_aggregation_function>
END STRUCT
STRUCT message_RUPM
    RUPVN              : Number
    DomID              : IP_address
    SourceID           : IP_address
    Module[ ].SAT[ ].Link.variables              // key1=Module_name, key2=SatID
    Module[ ].SAT[ ].Path.variables              // key1=Module_name, key2=SatID
END STRUCT
STRUCT Module[TraffLoad].variables
    LNK[ ].CTL.IG              : bps           // LNK[ ] vars used for local calcs, not send
    in RUPM
    LNK[ ].CTL.EG              : bps           //
    LNK[ ].FTL.IG              : bps           //
    LNK[ ].FTL.EG              : bps           //
    LNK[ ].OTL.IG              : bps           //
    LNK[ ].OTL.EG              : bps           //
    SAT[ ].Link.CTL.UD         : bps           // SAT[ ] vars are send in RUPM
```

-continued

| | | |
|---|---|---|
| SAT[ ].Link.CTL.DD | : bps | // |
| SAT[ ].Link.FTL.UD | : bps | // |
| SAT[ ].Link.FTL.DD | : bps | // |
| SAT[ ].Link.OTL.UD | : bps | // |
| SAT[ ].Link.OTL.DD | : bps | // |
| SAT[ ].Path.CTLMIN.UD | : bps | // |
| SAT[ ].Path.CTLMIN.DD | : bps | // |
| SAT[ ].Path.CTLMAX.UD | : bps | // |
| SAT[ ].Path.CTLMAX.DD | : bps | // |
| SAT[ ].Path.FTL.UD | : bps | // |
| SAT[ ].Path.FTL.DD | : bps | // |
| SAT[ ].Path.OTLMIN.UD | : bps | // |
| SAT[ ].Path.OTLMIN.DD | : bps | // |
| SAT[ ].Path.OTLMAX.UD | : bps | // |
| SAT[ ].Path.OTLMAX.DD | : bps | // |
| END STRUCT | | |

```
SUB Module[TraffLoad].aggregate( )
    # For each SAT, Sum Downstream Nodes OTL in Local OTL (SAT.DN.Link.OTL-
>SAT.Link.OTL):
    FOR s IN NDDB.SAT[ ] DO
        RMDB.SAT[s].Link.OTL.UD = 0 // prepare for summation
        RMDB.SAT[s].Link.OTL.DD = 0 // prepare for summation
        FOR n in NDDB.SAT[s].DNID[ ] DO
            RMDB.SAT[s].Link.OTL.UD += RMDB.MSG[n].SAT[s].Link.OTL.UD
            RMDB.SAT[s].Link.OTL.DD += RMDB.MSG[n].SAT[s].Link.OTL.DD
        END FOR
    END FOR
    # For each Link, Sum all SAT OTL into Link OTL (SAT.Link.OTL->Link.OTL):
    FOR l in Node.Links[ ] DO
        RMDB.LNK[l].OTL.EG = 0 // prepare for summation
        RMDB.LNK[l].OTL.IG = 0 // prepare for summation
        FOR s IN NDDB.SAT[ ] DO
            IF RMDB.SAT[s].Link == 1 // only if Link is SAT Upstream Link THEN
                RMDB.LNK[l].OTL.EG += RMDB.SAT[s].Link.OTL.UD
                RMDB.LNK[l].OTL.IG += RMDB.SAT[s].Link.OTL.DD
            END IF
        END FOR
    END FOR
    # For each Link calculate Link.FTL (Link.OTL->Link.FTL):
    FOR l in Node.Links[ ] DO
        RMDB.LNK[l].FTL.EG = RMDB.LNK[l].CTL.EG - RMDB.LNK[l].OTL.EG
        RMDB.LNK[l].FTL.IG = RMDB.LNK[l].CTL.IG - RMDB.LNK[l].OTL.IG
        # For each Link copy Link.FTL/CTL to SAT.Link.FTL/CTL (Link.FTL-
>SAT.Link.FTL):
        FOR s IN NDDB.SAT[ ] DO
            IF RMDB.SAT[s].Link == 1 // only if Link is SAT Upstream Link THEN
                RMDB.SAT[s].Link.FTL.UD = RMDB.LNK[l].FTL.EG
                RMDB.SAT[s].Link.FTL.DD = RMDB.LNK[l].FTL.IG
                RMDB.SAT[s].Link.CTL.UD = RMDB.LNK[l].CTL.EG
                RMDB.SAT[s].Link.CTL.DD = RMDB.LNK[l].CTL.IG
            END IF
        END FOR
    END FOR
    # For each Link and each SAT calculate Path.CTL/FTL/OTL (SAT.UN.Path.FTL-
>SAT.Path.FTL):
    FOR l in Node.Links[ ] DO
        FOR s IN NDDB.SAT[ ] DO
            IF RMDB.SAT[s].Link == 1 THEN // only if Link = SAT.Upstream_Link
                IF l.topology = transit THEN // for Root of SAT tree, upstream is copy link
                    n = NDDB.SAT[s].UNID
                    RMDB.MSG[n].SAT[s].Path = RMDB.SAT[s].Link
                END IF
                RMDB.SAT[s].Path.CTLMIN.UD = minimum(
RMDB.MSG[n].SAT[s].Path.CTLMIN.UD, RMDB.SAT[s].Link.CTL.UD )
                RMDB.SAT[s].Path.CTLMIN.DD = minimum(
RMDB.MSG[n].SAT[s].Path.CTLMIN.DD, RMDB.SAT[s].Link.CTL.DD )
                RMDB.SAT[s].Path.CTLMAX.UD = maximum(
RMDB.MSG[n].SAT[s].Path.CTLMAX.UD, RMDB.SAT[s].Link.CTL.UD )
                RMDB.SAT[s].Path.CTLMAX.DD = maximum(
RMDB.MSG[n].SAT[s].Path.CTLMAX.DD, RMDB.SAT[s].Link.CTL.DD )
                RMDB.SAT[s].Path.FTL.UD    = minimum(
RMDB.MSG[n].SAT[s].Path.FTL.UD, RMDB.SAT[s].Link.FTL.UD )
                RMDB.SAT[s].Path.FTL.DD    = minimum(
RMDB.MSG[n].SAT[s].Path.FTL.DD, RMDB.SAT[s].Link.FTL.DD )
                RMDB.SAT[s].Path.OTLMIN.UD = minimum(
```

```
                RMDB.MSG[n].SAT[s].Path.OTLMIN.UD, RMDB.SAT[s].Link.OTL.UD )
                    RMDB.SAT[s].Path.OTLMIN.DD = minimum(
                RMDB.MSG[n].SAT[s].Path.OTLMIN.DD, RMDB.SAT[s].Link.OTL.DD )
                    RMDB.SAT[s].Path.OTLMAX.UD = maximum(
                RMDB.MSG[n].SAT[s].Path.OTLMAX.UD, RMDB.SAT[s].Link.OTL.UD )
                    RMDB.SAT[s].Path.OTLMAX.DD = maximum(
                RMDB.MSG[n].SAT[s].Path.OTLMAX.DD, RMDB.SAT[s].Link.OTL.DD )
                END IF
            END FOR
        END FOR
END SUB
STRUCT Module[HopLateny].variables
    SAT[ ].Link.SHL : microseconds // Static Hop Latency
    SAT[ ].Link.PHL : microseconds // Proportional Hop Latency
    SAT[ ].Path.SHL : microseconds
    SAT[ ].Path.PHL : microseconds
END STRUCT
SUB Module[HopLateny].aggregate( )
    # For each SAT, Sum all Downstrean Nodes SHL/PHL into Local Node SHL/PHL
(SAT.DN.Link.SHL->SAT.Link.SHL):
    FOR s IN NDDB.SAT[ ] DO
        RMDB.SAT[s].Link.SHL = 0 // prepare for summation
        RMDB.SAT[s].Link.PHL = 0 // prepare for summation
        FOR n in NDDB.SAT[s].DNID[ ] DO
            RMDB.SAT[s].Link.SHL += RMDB.MSG[n].SAT[s].Link.SHL
            RMDB.SAT[s].Link.PHL += RMDB.MSG[n].SAT[s].Link.PHL
        END FOR
    END FOR
    # For each Link and each SAT calculate Path.SHL/PHL (SAT.UN.Path.SHL-
>SAT.Path.SHL):
    FOR l in Node.Links[ ] DO
        FOR s IN NDDB.SAT[ ] DO
            IF RMDB.SAT[s].Link == l THEN // only if Link = SAT.Upstream_Link
                IF l.topology = transit THEN // for Root of SAT tree, upstream is copy link
                    RMDB.SAT[s].Path.SHL = RMDB.SAT[s].Link.SHL
                    RMDB.SAT[s].Path.PHL = RMDB.SAT[s].Link.PHL
                ELSE
                    n = NDDB.SAT[s].UNID
                    RMDB.SAT[s].Path.SHL = RMDB.MSG[n].SAT[s].Path.SHL +
RMDB.SAT[s].Link.SHL
                    RMDB.SAT[s].Path.PHL = RMDB.MSG[n].SAT[s].Path.PHL +
RMDB.SAT[s].Link.PHL
                END IF
            END IF
        END FOR
    END FOR
END SUB
STRUCT Module[UserCount].variables
    SAT[ ].Link.ASC              : integer // Active Subscriber Count
    SAT[ ].Link.ISC              : integer // Inactive Subscriber Count
    SAT[ ].Path.ASC              : integer
    SAT[ ].Path.ISC              : integer
END STRUCT
SUB Module[UserCount].aggregate( )
    # For each SAT, Sum all Downstrean Nodes ASC/ISC into Local Node ASC/ISC
(SAT.DN.Link.ASC->SAT.Link.ASC):
    FOR s IN NDDB.SAT[ ] DO
        RMDB.SAT[s].Link.ASC = 0 // prepare for summation
        RMDB.SAT[s].Link.ISC = 0 // prepare for summation
        FOR n in NDDB.SAT[s].DNID[ ] DO
            RMDB.SAT[s].Link.ASC += RMDB.MSG[n].SAT[s].Link.ASC
            RMDB.SAT[s].Link.ISC += RMDB.MSG[n].SAT[s].Link.ISC
        END FOR
    END FOR
    # For each Link and each SAT calculate Path.ASC/ISC (SAT.UN.Path.ASC-
>SAT.Path.ASC):
    FOR l in Node.Links[ ] DO
        FOR s IN NDDB.SAT[ ] DO
            IF RMDB.SAT[s].Link == l THEN // only if Link = SAT.Upstream_Link
                IF l.topology = transit THEN // for Root of SAT tree, upstream is copy link
                    RMDB.SAT[s].Path.ASC = RMDB.SAT[s].Link.ASC
                    RMDB.SAT[s].Path.ISC = RMDB.SAT[s].Link.ISC
                ELSE
                    n = NDDB.SAT[s].UNID
                    RMDB.SAT[s].Path.ASC = RMDB.MSG[n].SAT[s].Path.ASC +
RMDB.SAT[s].Link.ASC
                    RMDB.SAT[s].Path.ISC = RMDB.MSG[n].SAT[s].Path.ISC +
RMDB.SAT[s].Link.ISC
                END IF
```

-continued

```
            END IF
        END FOR
    END FOR
END SUB
```

```
// ------+++------------+++------------+++------------+++------------+++------
// SAT-RM Algorithm
SUB start_mainloop_SATRM( )
    // start timer which is minimum interval to send new msg
    nextRUPIT = currentTime( ) + Domain.RUPIT
    RUPF = false // Resource Update Flag
    LOOP
        WHILE currentTime( ) < nextRUPIT DO
            If detected_Local_Resource_change( )
                RUPF = true
            END IF
            IF change_Reservation_add_remove_timeout( )
                RUPF = true
            END IF
            IF incoming_RUPM_message( )
                message = incoming_RUPM_message( )
                IF message.DomID != Node.DomID THEN
                    CONTINUE WHILE
                END IF
                s = message.SourceID
                RMDB.MSG[s].NodeID = message.SourceID
                RMDB.MSG[s].RUPVN = message.RUPVN
                RMDB.MSG[s].Module[ ].SAT[ ].Link.variables =
message.Module[ ].SAT[ ].Link.variables
                RMDB.MSG[s].Module[ ].SAT[ ].Path.variables =
message.Module[ ].SAT[ ].Path.variables
                RUPF = true
            END IF
        END WHILE
        // now where are ready to calculate and send a RUPM message to all our
neighbors:
        nextRUPIT = currentTime( ) + Domain.RUPIT      // start new timer
        FOR m in Defined_Modules DO // let each module do its own calcs, later send
new RUPM
            CALL SUB Module[m].aggregate( )
        END FOR
        send_RUPM_message_on_all_Links_by_MultiCast( )
    END LOOP
END SUB
// ------+++------------+++------------+++------------+++------------+++------
```

CLOSING NOTES

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

Figure 23A:
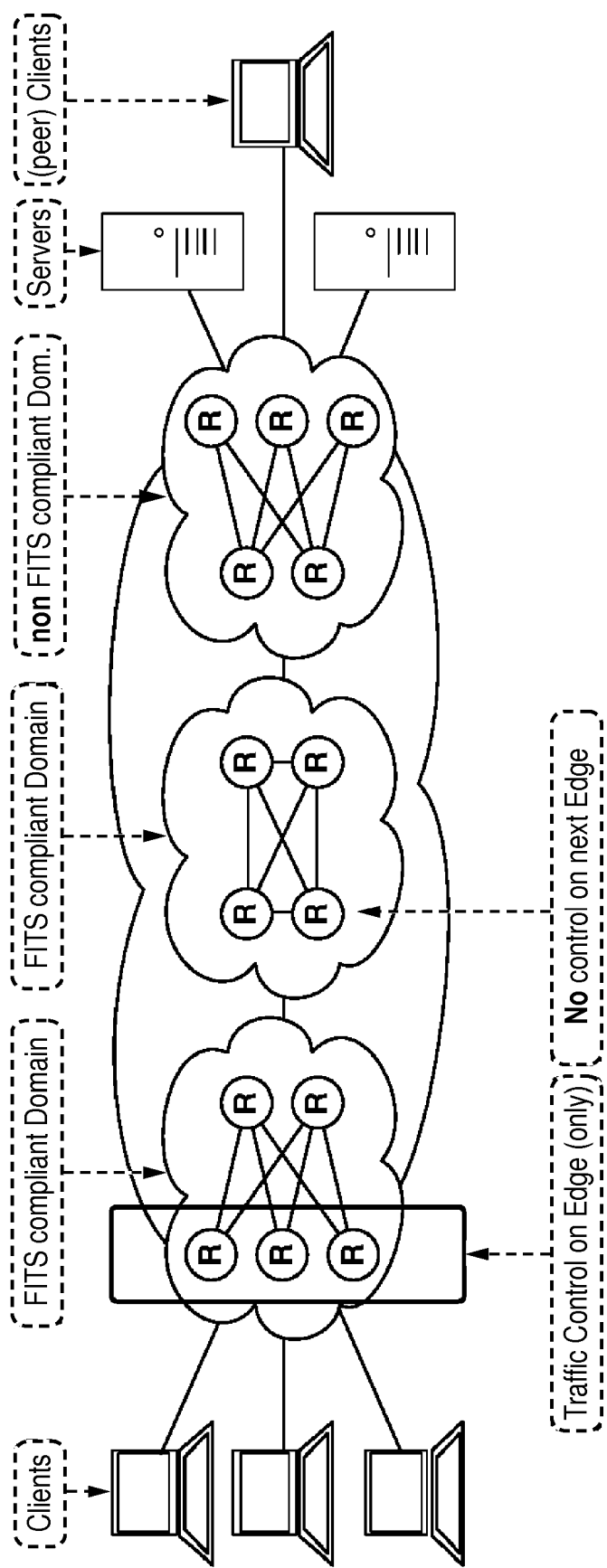
Figure 23B:
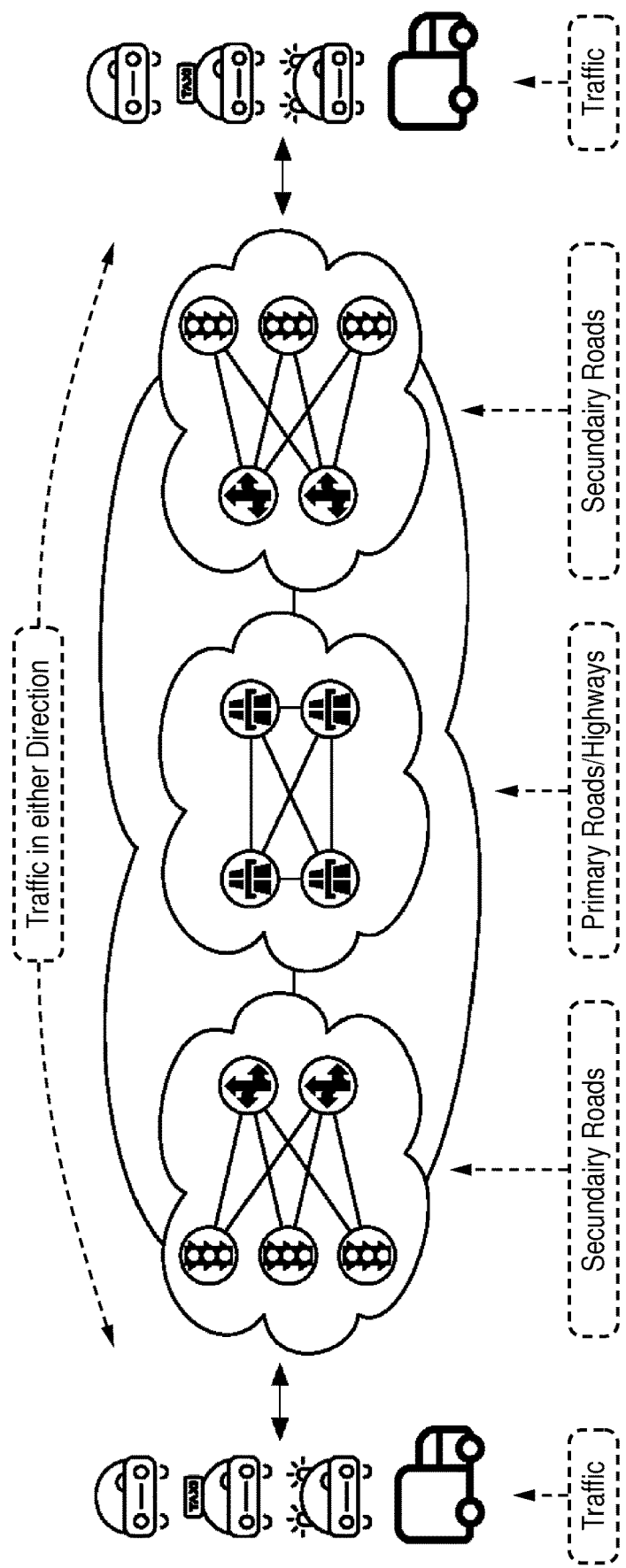

While the invention is described above with reference to a packet-switched network, the principle of the invention may find application in many other areas, such as road or train transport networks, or logistics management in factories et cetera. FIG. 23A schematically illustrates an application of the invention in a packet-switched network, while FIG. 23B schematically illustrates an application of the invention for delivery trucks in a road transport network.

Some or all aspects of the invention may be implemented in a computer program product, i.e. a collection of computer prom instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A method of distributing and aggregating resource data in a network domain comprising a plurality of nodes, the method comprising:
   (1) construction by each of a plurality of edge nodes of a respective spanning tree that connects said edge node as a root node of said tree to all other edge nodes as leaf nodes in the domain and that identifies for each node other than said edge node in said tree a single upstream neighbour node and zero or more downstream neighbour nodes, and
   (2) detection by any node having a change in resource data in connection with a particular spanning tree it is a member of that a change in resource data has occurred and transmission by the node experiencing the change in resource data of a message to update each of its upstream and downstream neighbours in that spanning tree about said change, and
   (3) calculation by each upstream and downstream neighbour of an impact of said change to its own resource data and transmission by each upstream and downstream neighbour of a message to update each of its upstream and downstream neighbours in that spanning tree about said impact.

2. The method of claim 1, in which in step 3 is skipped for an upstream or downstream neighbour which is the node of step 2.

3. The method of claim 1, in which the messages of steps 2 and/or 3 are accumulated into combined messages carrying all of the resource data that belongs to all of the spanning trees.

4. The method of claim 3, in which the combined messages are sent at predetermined intervals.

5. The method of claim 1, in which, instead of sending a message for each update, updates are accumulated over spanning trees and accumulated updates are sent to all upstream and downstream nodes of said node.

6. The method of claim 1, in which the resource data is aggregated using a data type-specific aggregation function.

7. The method of claim 1, in which a first resource data type is "Link Local" and a second resource data type is "Edge Path", where Link Local represents resource data of a link to the upstream node in said tree and Edge Path represents resource data of all links of nodes along a path in the tree connecting said node to the root node of the tree.

8. A computer system comprising a processor and a memory, said memory comprising computer code executable by said processor, said computer code being configured for causing said processor to perform the method of claim 1.

9. A non-transitory computer-readable storage memory comprising executable code for causing a computer to perform the method of claim 1.

* * * * *